INVENTOR.
GEORGE F. QUAYLE
BY
ATTORNEY

INVENTOR.
GEORGE F. QUAYLE
BY
ATTORNEY

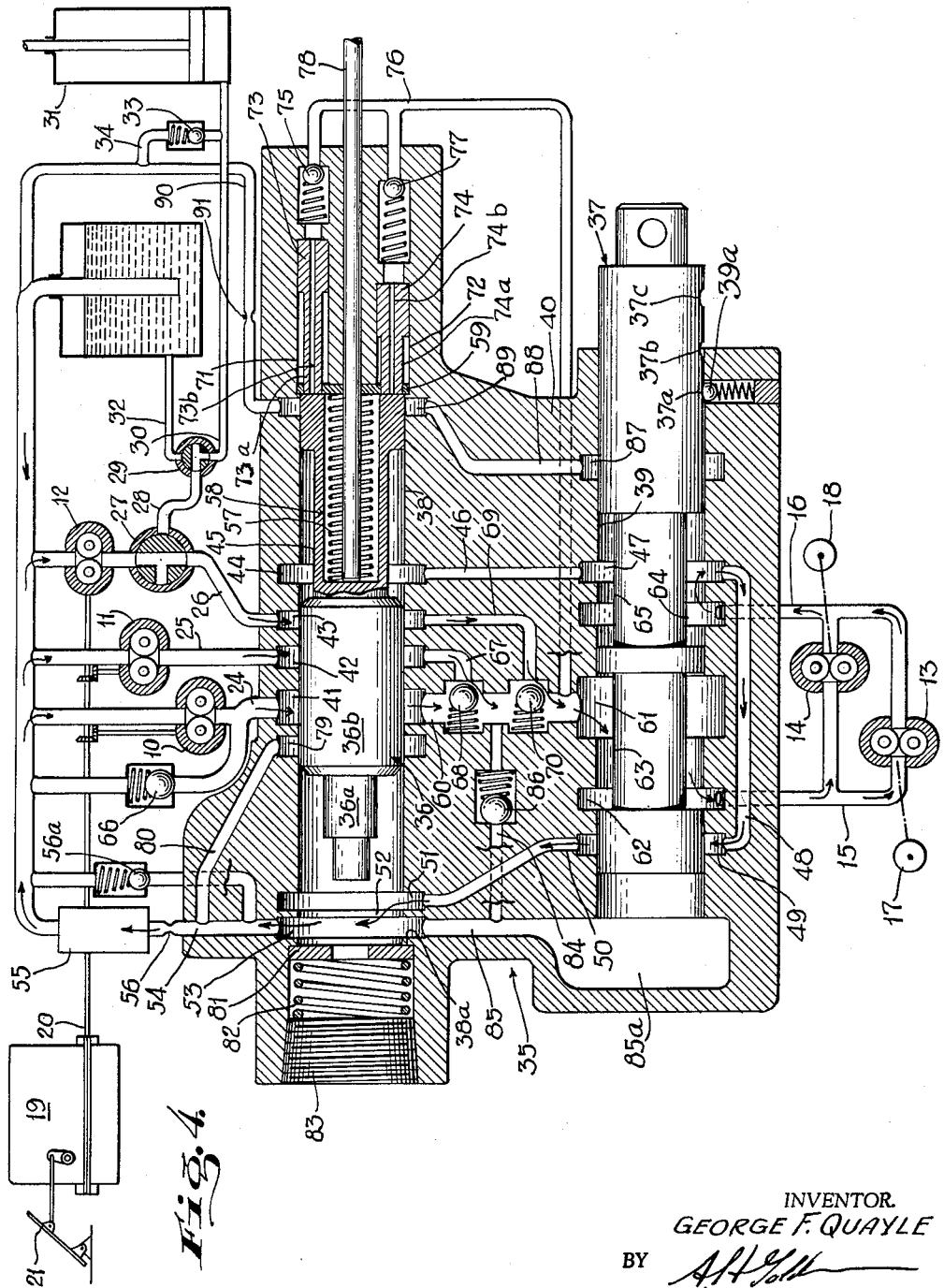

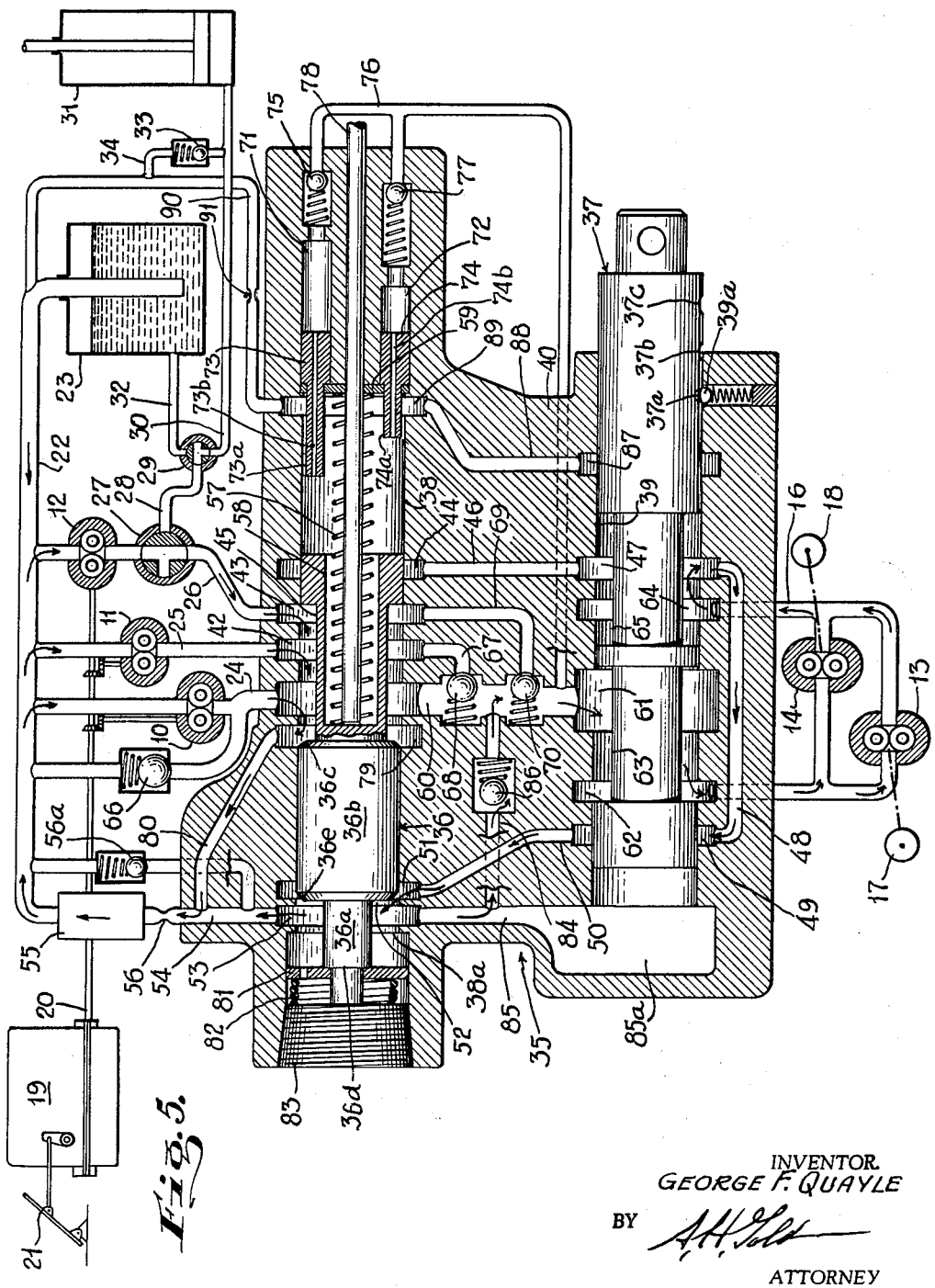

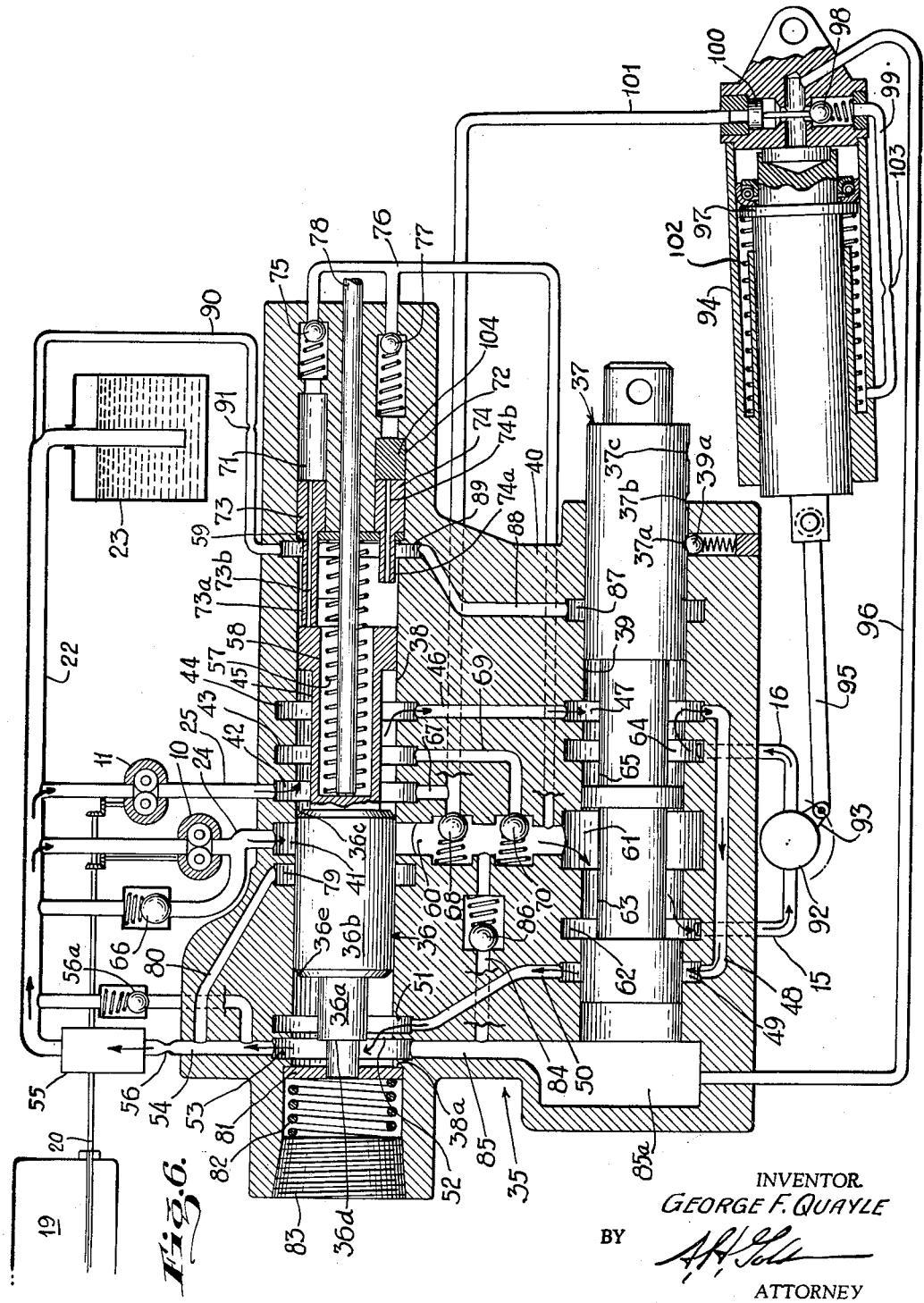

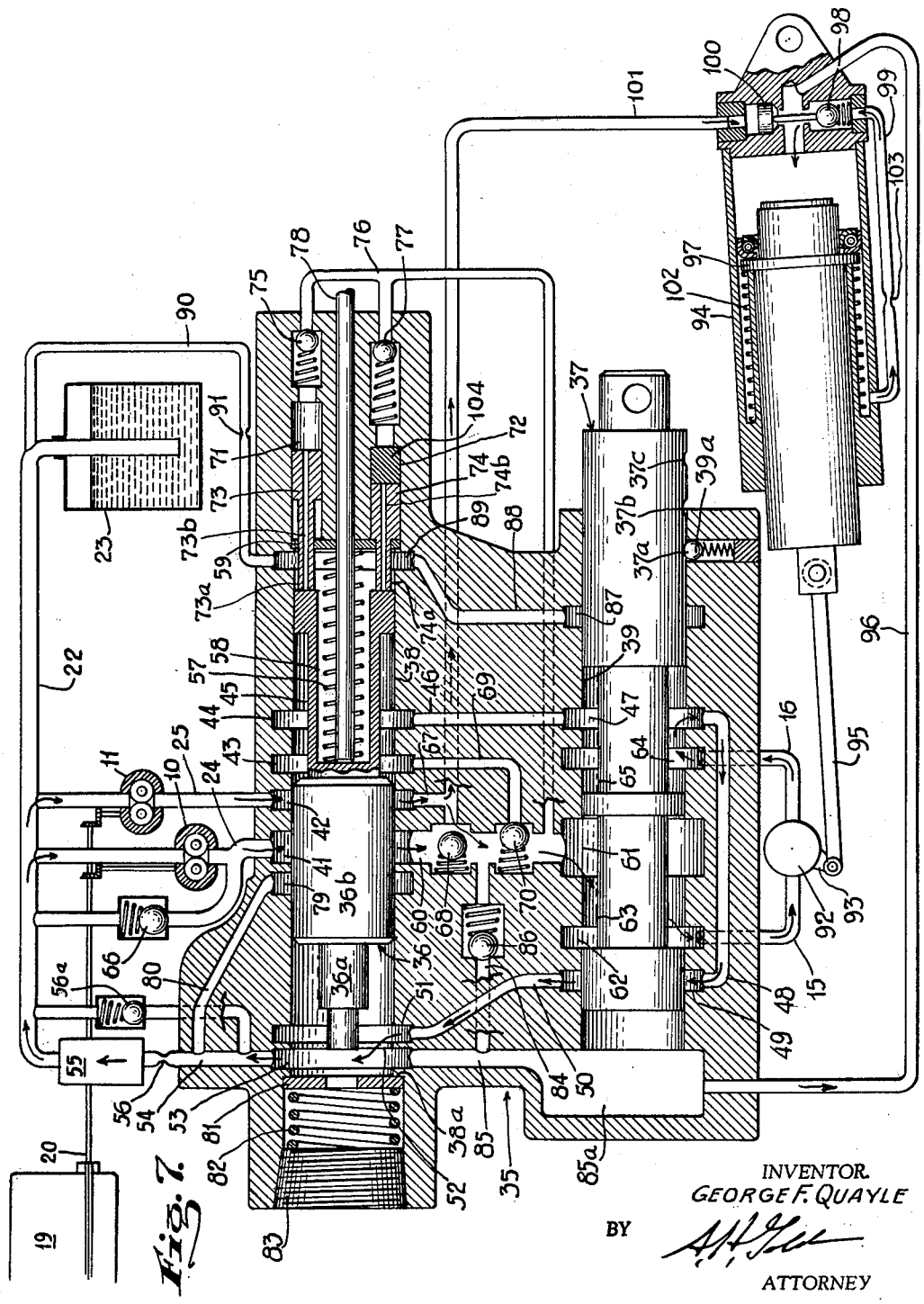

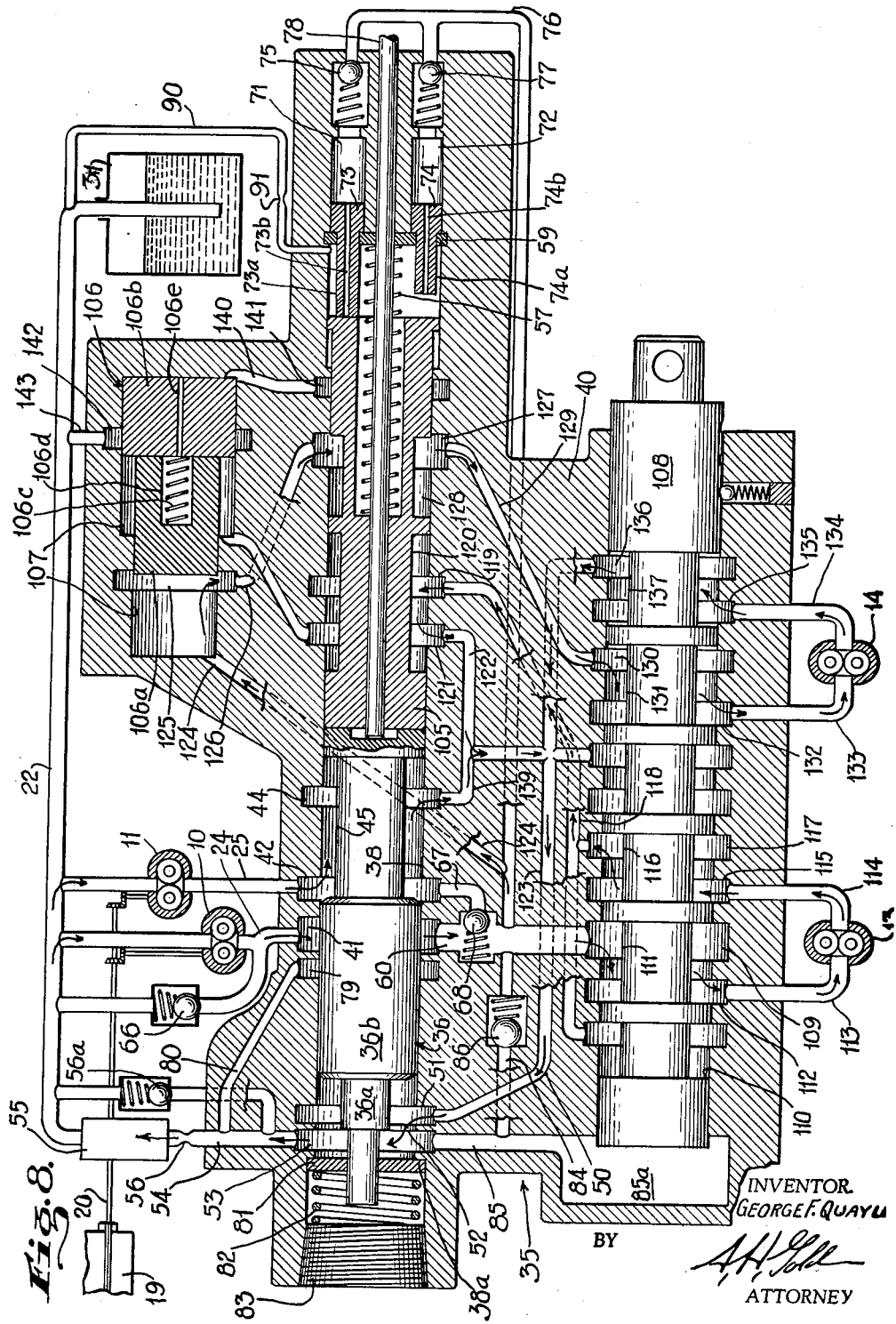

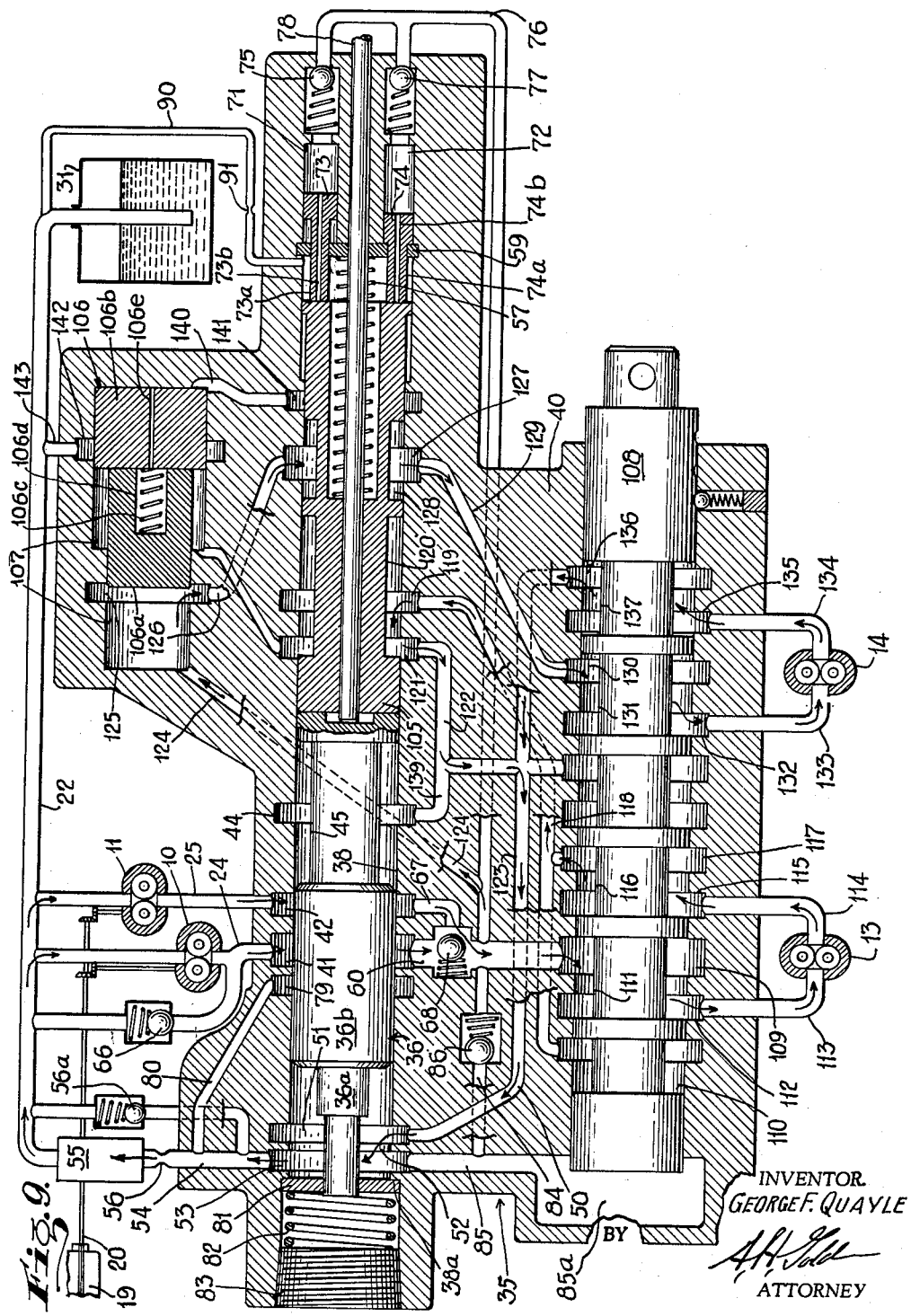

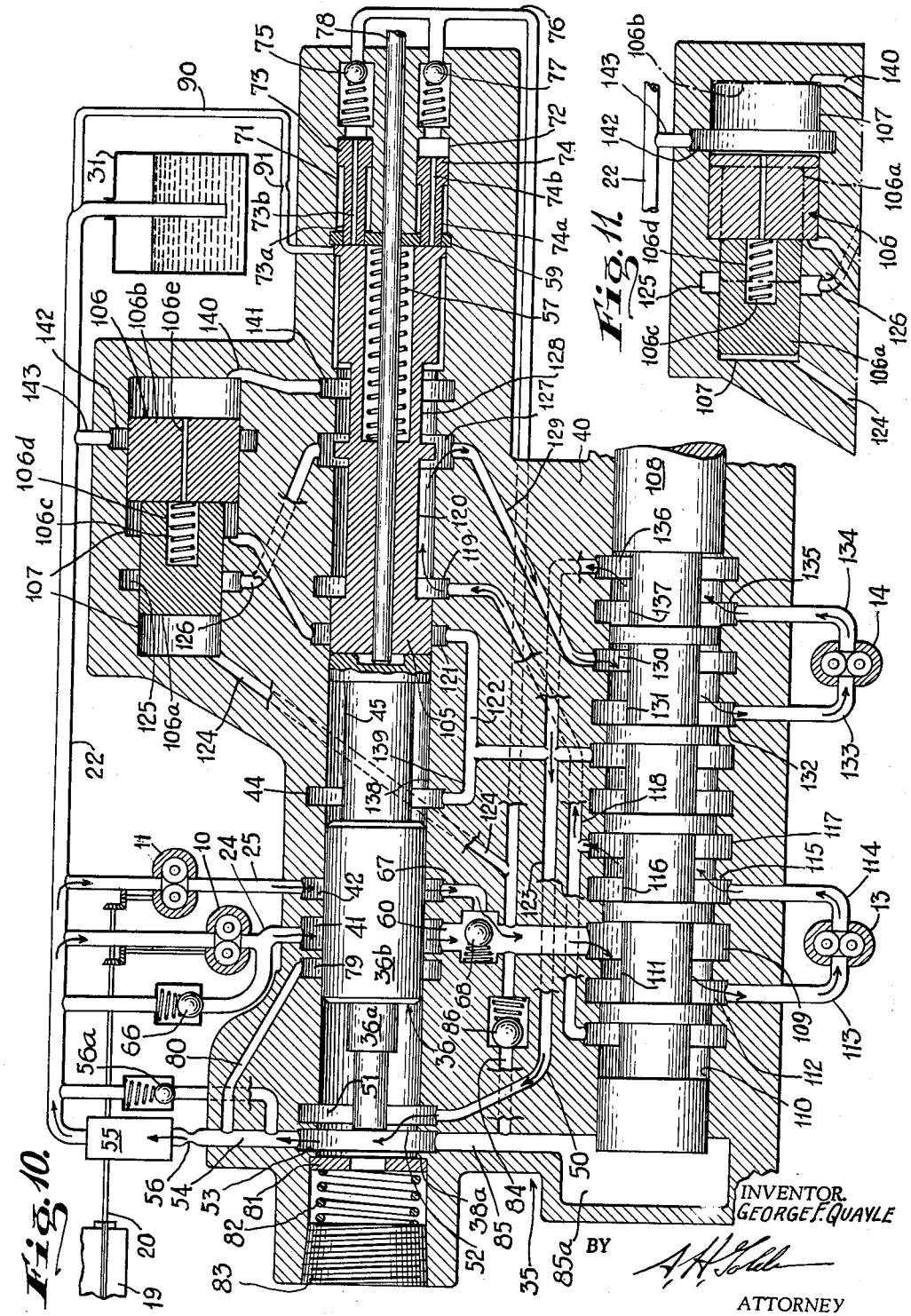

United States Patent Office 3,182,444
Patented May 11, 1965

3,182,444
HYDRAULIC DRIVE FOR INDUSTRIAL TRUCK
George F. Quayle, Philadelphia, Pa., assignor, by mesne assignments, to Yale & Towne, Inc., New York, N.Y., a company of Ohio
Filed June 25, 1963, Ser. No. 290,552
44 Claims. (Cl. 60—19)

This invention relates to a hydraulic drive for an industrial truck, and in particular, to a hydraulic drive which incorporates pump means driven by an internal combustion engine on the truck and hydraulic motor means which are coupled to the traction wheels of the truck and are adapted to be driven by fluid supplied by the pump means.

The purpose of the invention is to provide a very simple, relatively inexpensive hydraulic drive of this type that enables the operator to smoothly bring the truck from a standstill position to high speed solely through operation of the accelerator of the engine.

To this end, the hydraulic drive of the invention includes two control means, one of which acts in response to predetermined increases in the speed of the engine to increase the volume of fluid supplied to the hydraulic motor means by the hydraulic pump means, whereby the mechanical advantage between the engine and the hydraulic motor means is decreased and the speed of the truck increased. The other control means acts in response to an overload condition to overrule the first control means and decrease the volume of fluid supplied to the hydraulic motor means to thereby increase the mechanical advantage between the engine and the hydraulic motor means to prevent overloading and stalling of the engine.

With this arrangement, when the operator first actuates the accelerator of the engine, a high mechanical advantage is provided between the engine and the hydraulic motor means to start the truck moving at low speed. As the operator further actuates the accelerator and the speed of the engine increases, the mechanical advantage between the engine and the hydraulic motor means is decreased with resulting increase in speed of the truck. Should the load on the hydraulic motor means suddenly increase, as may occur when the truck starts up an incline, the second control means which is responsive to the load on the hydraulic motor means quickly overrules the first control means to increase the mechanical advantage between the engine and the hydraulic motor means to prevent overloading and stalling of the engine.

As a feature of the invention, the hydraulic pump means includes a plurality of separate pumps driven by the engine, and the control means include a control valve which moves in response to increases in the engine speed, above the idling speed of the engine, to first connect one pump and then an additional pump or pumps to the hydraulic motor means to increase the volume of fluid supplied to the hydraulic motor means and thereby decrease the mechanical advantage between the engine and the hydraulic motor means and increase the speed of the hydraulic motor means.

As a further feature of the invention, the control valve is moved by increases in pressure developed by increases in the rate of flow of fluid from the pumps as the engine speed is increased.

As still another feature of the invention, a bypass arrangement is provided whereby when the truck is coasting and the hydraulic motor means is therefore acting as a pump, extra fluid under pressure other than that supplied by the pumps, is supplied to the hydraulic motor means to provide proper charging of the hydraulic motor means while acting as a pump to prevent it from running dry. Means are also provided which are actuated through operation of the brakes of the truck to bypass fluid from the pumps directly to the reservoir to thereby prevent overloading of the engine during braking, and also to restrict the flow of fluid from the hydraulic motor means to provide additional braking action when the truck is coasting and the hydraulic motor means is therefore functioning as a pump.

As still another feature of one form of the invention, the hydraulic motor means is a variable displacement motor, and means are provided which are responsive after a predetermined increase in the speed of the engine to decrease the displacement of the hydraulic motor and further decrease the mechanical advantage between the engine and the hydraulic motor and increase the speed of the hydraulic motor.

As a feature of another form of the invention, two hydraulic motors are used and control means are provided which are responsive to a predetermined increase in the speed of the engine to change the connection between the two hydraulic motors from parallel to series, whereby to decrease the velocity of the fluid, and decrease heating of the fluid. Means are also provided whereby when the hydraulic motors are connected in series, the pressure drops across the two motors are equalized to provide a differential effect when the two motors are operating at different speeds, such as occurs when the truck turns a corner.

Other objects and advantages of the invention will become apparent when read in conjunction with the accompanying drawings, wherein:

FIG. 1 is a view, partly in section and partly schematic, showing one form of hydraulic drive constructed in accordance with the invention which includes three pumps driven by the truck engine and two constant displacement motors adapted to be driven by hydraulic fluid supplied by the pumps. In FIG. 1, the control means are shown in an idling position, with the fluid circulating, as indicated by the arrows, without driving the hydraulic motors;

FIG. 4 is a view similar to FIG. 3, but showing the control means in third speed position with fluid from all three pumps driving the hydraulic motors;

FIG. 5 is a view similar to FIG. 1, but showing the control means moved to braking position, restricting flow of fluid from the hydraulic motors to provide a braking action;

Figure 1:
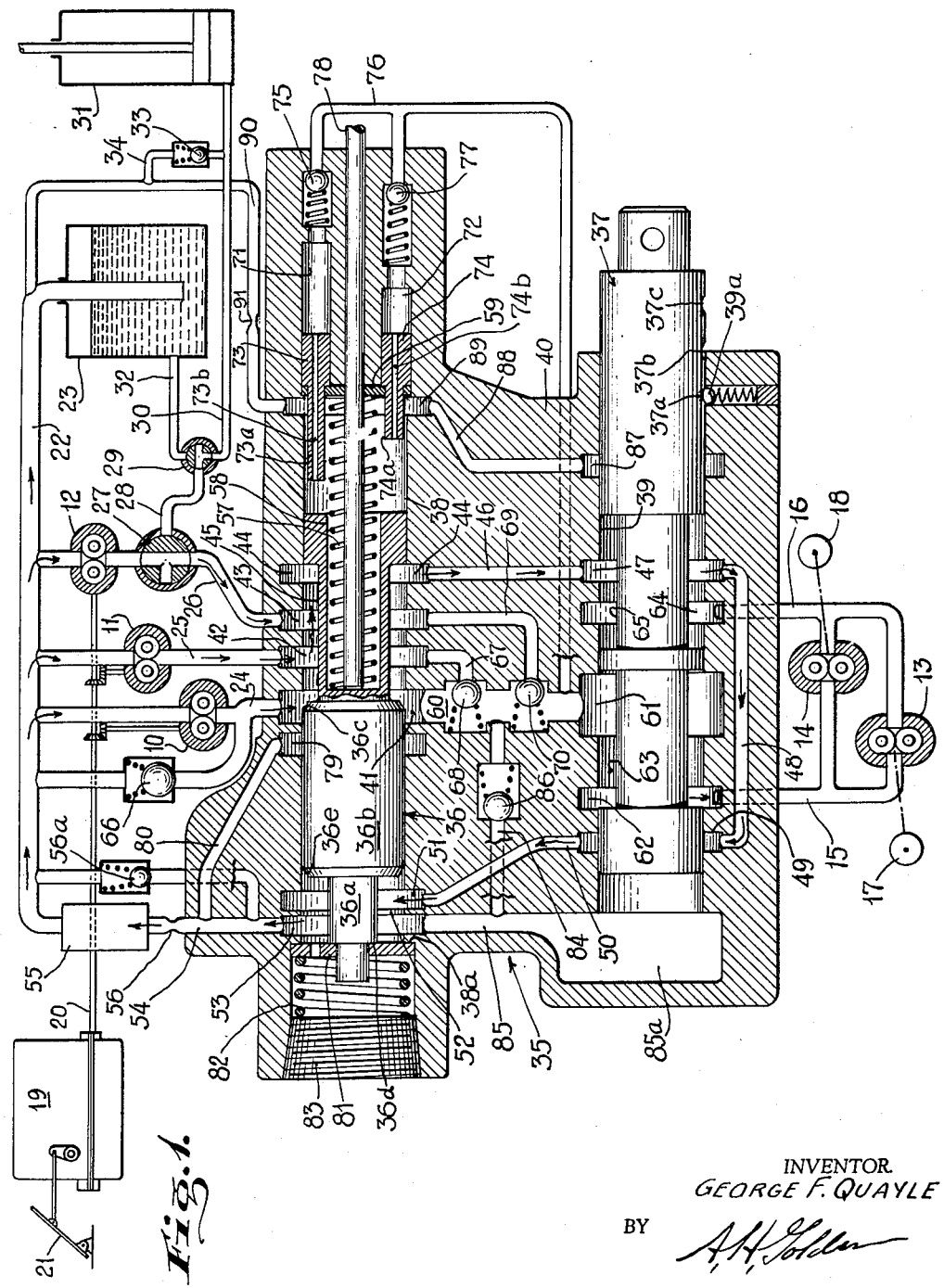

FIG. 6 is a view similar to that of FIG. 1, but showing a slightly different form of hydraulic drive in which the constant displacement motors are replaced by a variable displacement motor, the displacement of which is controlled by a servo motor. In FIG. 6, the control means are shown in the first speed position, with one pump driving the hydraulic motor, while the hydraulic motor is at maximum displacement;

FIG. 7 is a view similar to that of FIG. 6, but showing the control means in a position which two pumps supply fluid to the hydraulic motor and the displacement of the hydraulic motor decreased by operation of the servo motor;

FIG. 8 is a view similar to that of FIG. 1, but showing still another form of hydraulic drive in which the control means include means for changing the connection of the two hydraulic motors for parallel to series during high speed operation and means for equalizing the pressure drop across the two motors when the motors are connected in series. In FIG. 8, the control means are shown in first speed position with only one pump supplying fluid to the motors while the motors are connected in parallel;

FIG. 9 is a view similar to that of FIG. 8, but showing the control means in second speed position with two pumps supplying fluid to the hydraulic motors while the motors are connected in parallel;

FIG. 10 is a view similar to that of FIG. 19, but showing the motors connected in series; and FIG. 11 is a sectional view of the means for equalizing the pressure drops across the two hydraulic motors when the motors are connected in series, and showing in solid lines the position of these means when the truck turns a corner in one direction and showing in broken lines the position of these means when the truck turns a corner in the other direction.

Referring to the drawings and in particular to FIG. 1 there is shown one form of hydraulic drive constructed in accordance with the invention. This drive includes three constant displacement hydraulic pumps 10, 11 and 12 for supplying fluid under pressure to drive two hydraulic motors 13 and 14. The motors 13 and 14 are connected in parallel through lines 15 and 16 and each motor is coupled to a traction wheel of the truck, as diagrammatically shown at 17 and 18.

The three pumps 10, 11 and 12 are coupled to an internal combustion engine 19 by common means, such as diagrammatically shown as a shaft 20 in the drawing, whereby the three pumps are driven simultaneously by operation of the engine 19. The speed of the engine 19 and therefore the speed of the three pumps may be increased in the conventional manner through operation of an accelerator 21.

The three pumps 10, 11 and 12 are each connected by a common intake line 22 to a fluid reservoir 23, and each pump is provided with a separate discharge line 24, 25 and 26, respectively. The discharge line 26 of the pump 12 may be provided with a bypass valve 27 whereby fluid may be bypassed from the pump 12 through a line 28, a valve 29 and a line 30 to operate a lift ram 31, as commonly used on industrial trucks. The pressure on the lift ram 31 may be released by operation of the valve 29 to connect the line 30 with a line 32 to the reservoir 23. A pressure relief valve 33, provided in a line 34, connecting the line 30 with the reservoir 23, opens under excessive pressure to relieve the pressure on the ram 31, to prevent overloading of the ram.

The flow of fluid from the pumps 10, 11 and 12 is controlled through novel valve means, generally indicated at 35. This valve means includes two spools 36, 37 which may be termed, according to their primary functions, as a speed control spool and a reversing spool. The speed control spool 36 is slidably mounted in a bore 38, while the reversing spool 37 is mounted in a bore 39, both of which bores 38 and 39 are conveniently formed in a common valve body 40.

As will be described in detail hereafter, the speed control spool 36 moves in response to predetermined increases in the speed of the engine 19, to first connect only pump 10 to the hydraulic motors 13 and 14, then connect pumps 10 and 11 to the hydraulic motors, and finally connect all three pumps 10, 11 and 12 to the hydraulic motors. In this manner, the mechanical advantage between the engine 19 and the hydraulic motors 13 and 14 is decreased as the speed of the engine 19 is increased.

The reversing spool 37 is utilized merely to change the direction of the flow of fluid to the motors 13 and 14 to thereby change the direction of travel of the truck, or to disconnect the motors 13 and 14 from the circuit. In FIG. 1, the reversing spool is shown in a drive position in which fluid may be supplied to the motors through line 15 and returned through line 16. The spool 37 is held in this poistion by engagement of spring pressed detent 39a in a recess 37a in the spool 37. If the spool 37 is moved to the left to a point where detent 39a is engaged in a recess 37b, the motors 13 and 14 are disconnected from the circuit, and if the spool 37 is moved further to the left to the point where detent 39a is engaged in a recess 37c, the fluid is supplied to the motors through line 16 and returned through line 15.

Bore 38 of the speed control spool 36 is provided with four axially spaced annular grooves 41, 42, 43 and 44. The grooves 41, 42 and 43 are connected respectively to the discharge lines 24, 25 and 26 of the pumps 10, 11 and 12. The groove 44 is connected to the reservoir 23 by a circuit formed by a passage 46 which connects the groove 44 with a groove 47 formed in the right-hand end of the bore 39 for the reversing spool 37, a passage 48 which connects the groove 47 with a groove 49 formed in the left-hand end of the bore 39, a passage 50 interconnecting the groove 49 and a groove 51 formed in the left-hand end of the bore 38 of the speed control spool 36, a space 52 in the left-hand of the bore 38 formed by a reduced end portion 36a of the spool 36, a groove 53 also formed in the left-hand end of the bore 38, but spaced axially to the left from the groove 51, a passage 54, a fluid cooler 55 and the line 22.

The spool 36 is provided with an elongated groove 45 and when the spool 36 is in the position shown in FIG. 1, the groove 45 connects the grooves 41, 42, 43 with the groove 44, so that the fluid from all three pumps 10, 11 and 12 circulates, as shown by the arrows in FIG. 1, without driving the hydraulic motors 13 and 14.

It will be noted that the passage 54 which interconnects the groove 53, at the left-hand end of the bore 38, and the cooler 55 is provided with a restriction 56, and as the fluid from the three pumps passes through this restriction 56 and the cooler 55, during circulation thereof as shown in FIG. 1, there is a pressure drop across this restriction 56 and the cooler 55, creating fluid pressure in the space 52 to the left of the enlarged portion 36b of the spool 36. This pressure acts on the left-hand end of the enlarged portion 36b of the spool 36 in a direction tending to move the spool 36 to the right against the pressure of a spring 57 which urges the spool 36 to the left. The spring 57 is interposed between the inner end of a bore 58 formed in the right-hand end of the spool 36 and a plate 59 provided in the right-hand end of the bore 38.

The force exerted by the spring 57 on the spool 36 is such that during operation of the engine 19 at idling speed, the pressure created in the space 52 by the flow of fluid through the restriction 56 is insufficient to move the spool 36 to the right against the force of the spring 57, so that the fluid from the three pumps merely circulates as indicated by the arrows in FIG. 1, without driving the hydraulic motors 13 and 14.

If, however, the operator wishes to start the truck moving, he merely increases the speed of the engine 19 through operation of the accelerator 21 to thereby increase the rate of flow through the restriction 56. As the rate of flow through the restriction 56 increases, the pressure in the space 52 increases until the force exerted thereby on the enlarged portion 36b of the spool 36 is sufficient to overcome the force of the spring 57 and move the spool 36 to the right.

Figure 2:
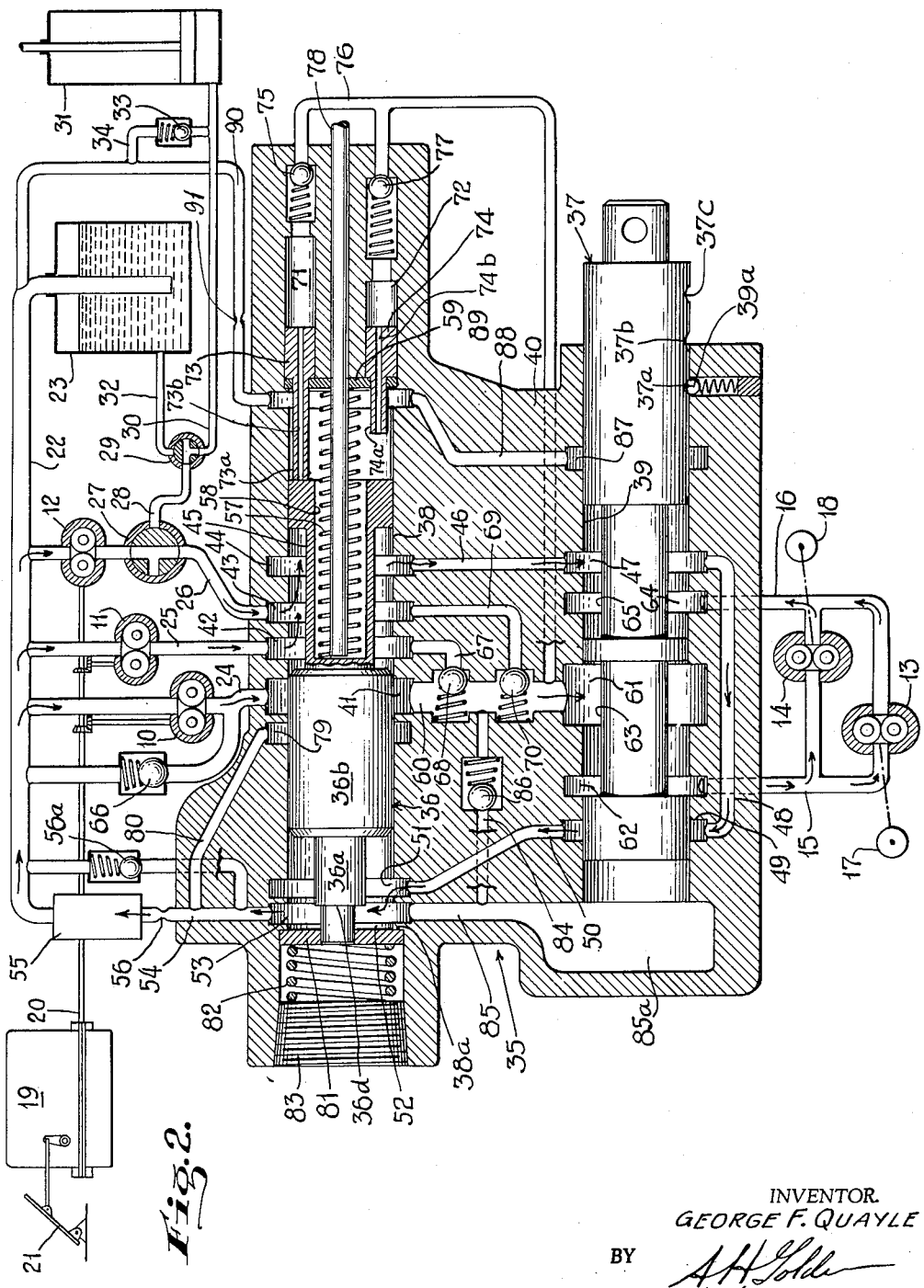
FIG. 2 is a view, similar to that of FIG. 1, but showing the control means in first speed position, with hydraulic fluid from one pump driving the hydraulic motors.

As the spool 36 is moved to the right by an increase in the fluid pressure in the space 52, the groove 41 is first covered by the enlarged portion 36b of the spool 36, as shown in FIG. 2. When the groove 41 is completely covered by the enlarged portion 36b of the spool 36, the groove 41 is disconnected from the groove 44, and all the fluid from the pump 10 must flow through a passage 60.

The passage 60 is connected with a central groove 61 formed in the bore 39 for the reversing spool 37. In the position of the reversing spool 37 as shown in FIG. 1, the groove 61 is connected to a groove 62 in the bore 39 through an elongated groove 63 formed in the reversing spool 37, so that fluid pressure is applied to line 15 to drive the hydraulic motors 13 and 14. As only pump 10 is connected to the motors 13 and 14 at this time, a high mechanical advantage is provided between the engine 19 and the hydraulic motors 13 and 14 to start the truck moving. Preferably, the right-hand end of the enlarged portion 36b of the spool 36 is provided with a bevel 36c to provide a throttling action as the enlarged portion closes the groove 41, to provide smooth starting of the truck.

At this time, the grooves 42, 43 and 44 are still interconnected by the groove 45 and the fluid from the pumps 11 and 12 still circulates through the restriction 56 as previously described.

At the same time, the fluid from the low pressure side of the hydraulic motors 13 and 14 is also circulated through the restriction 56, as the return line 16 is connected with the groove 47 by means of a groove 64 formed in the bore 39 and an elongated groove 65 formed in the spool 37.

Thus, while pump 10 is connected to the hydraulic motors 13 and 14, the fluid from all three pumps 10, 11 and 12 still passes through the restriction 56 as indicated by the arrows in FIG. 2.

If for some reason the truck cannot move, as for example if the wheels are against a chock, the speed of the engine 19 will decrease under the load with a consequent decrease in the pressure in the space 52, so that the spring 57 moves the spool 36 back to the position shown in FIG. 1, removing the load from engine 19. If the operator further actuates the accelerator 21 to speed up the engine 19, the pressure build-up by the pump 10 against the locked motors 13 and 14 will be sufficient to open a high pressure relief valve 66 to connect the discharge line 24 of the pump 10 with the line 22 to relieve the pressure and prevent overloading and stalling of the engine 19.

Figure 3:
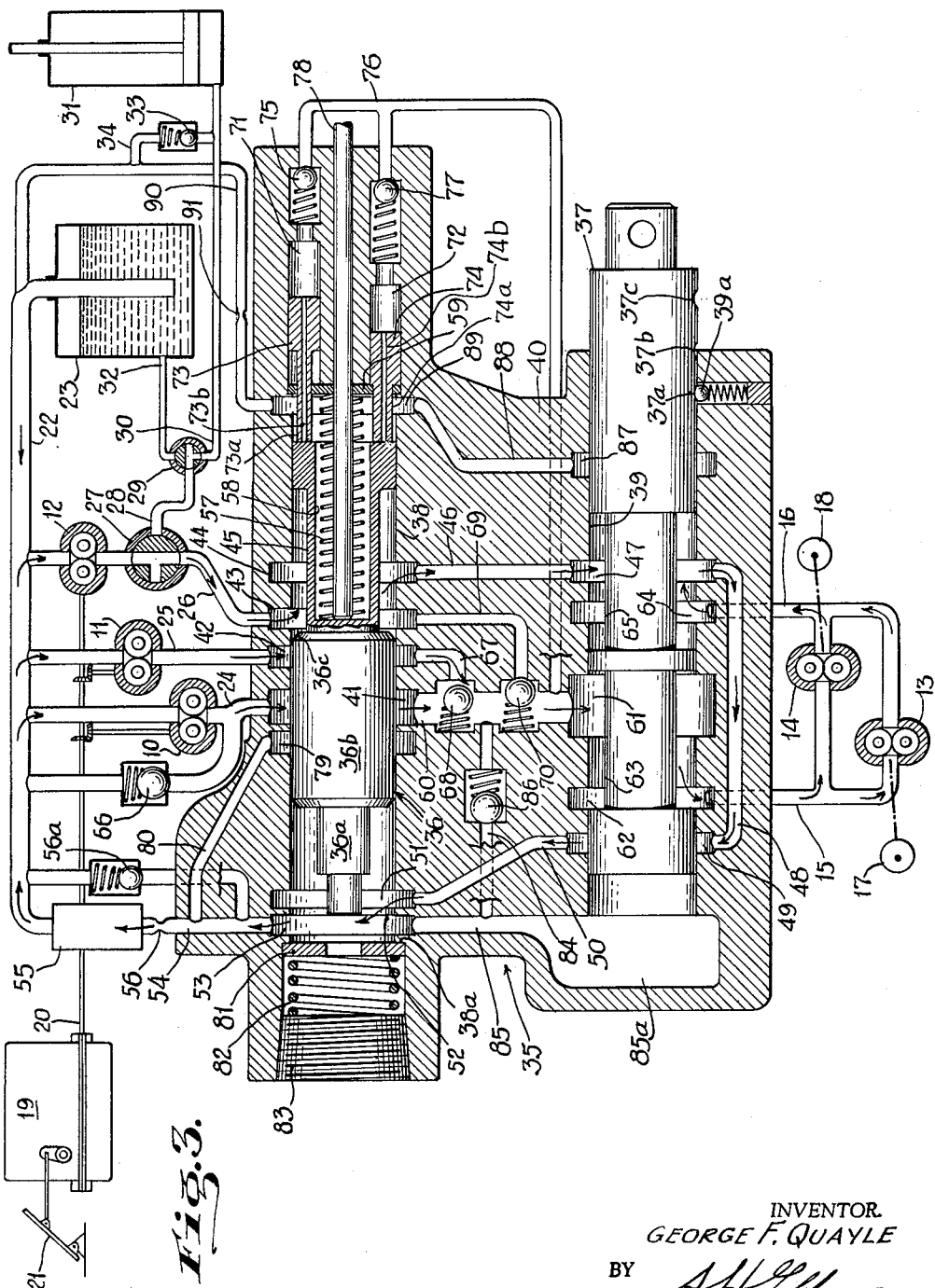
FIG. 3 is a view similar to FIG. 2, but showing the control means in second speed position, with fluid from two pumps driving the hydraulic motors.

If, however, the truck is not against an obstruction, and the speed of the engine 19 is further increased so as to increase the rate of flow of fluid through the restriction 56 and thereby increase the fluid pressure in the space 52, the spool 36 is moved further to the right against the force of the spring 57, until the enlarged portion 36b of spool 36 also closes groove 42, as shown in FIG. 3. When the groove 42 is closed by the enlarged portion 36b, fluid from the pump 11 must flow through a passage 67 into passage 60, through unseating of a check valve 68, so that the fluid from both pumps 10 and 11 is applied to drive the motors 13 and 14, as indicated by the arrows in FIG. 3. With both pumps 10 and 11 driving the hydraulic motors 13 and 14, the mechanical advantage between the engine 19 and the hydraulic motors is decreased with resulting increase in the speed of the hydraulic motors 13 and 14.

If the speed of the engine 19 is further increased, so as to further increase the rate of flow of fluid through the restriction 56 and further increase the pressure in the space, the spool 36 is moved further to the right against the force of the spring 57, until the groove 43 is also closed by the enlarged portion 36b of the spool 36 as shown in FIG. 4. When the groove 43 is closed by the enlarged portion 36b, fluid from the pump 12 must flow through a passage 69 into the passage 60, through unseating of a check valve 70. Thus at this point, all three pumps 10, 11 and 12 supply fluid to drive the motors 13 and 14, as indicated by the arrows in FIG. 4, decreasing the mechanical advantage between the engine 19 and the hydraulic motors 13 and 14 and increasing the speed of the hydraulic motors. As this is the limit of necessary movement of the spool 36 to the right, further increases in the pressure in the space 52 are not necessary. A relief valve 56a is therefore provided which opens at a pressure slightly higher than that necessary to hold the spool in the position shown in FIG. 4, to bypass fluid around the restriction 56 and the cooler 55.

Thus assuming no overload condition, it can be seen that merely through operation of the accelerator 21 to increase the speed of the engine 19, the mechanical advantage between the engine 19 and the hydraulic motors is decreased in three steps, with a resulting increase in the speed of the truck.

Referring again to FIG. 1, it will be noted that the right-hand end of the bore 38, in which the speed control spool 36 operates, is provided with two small bores 71 and 72 in which are slidably mounted two small pistons 73 and 74. The piston 73 has an end portion 73a of reduced diameter which extends through an opening in the plate 59, and the piston 74 has an end portion 74a of reduced diameter which also extends through an opening in the plate 59. Movement of pistons 73 and 74 to the left is limited by engagement of the shoulders formed by the reduced end portions 73a and 74a with the plate 59.

Referring now to FIGS. 2 and 3, it will be noted that the length of the end portions 73a of the piston 73 is such that when the speed control spool 36 is in the first speed position as shown in FIG. 2, the right-hand end of the spool 36 contacts the inner end of the reduced portion 73a of the piston 73, so that on further movement of the speed control spool 36 to the right, the piston 73 is moved inwardly of the bore as shown in FIG. 3. During such inward movement of the piston 73, fluid on the right-hand side of the piston may pass from the right-hand side of the piston to the left-hand side of the piston through a bleed passage 73b formed axially through the piston 73.

As best shown in FIG. 3, the length of the reduced end portion 74a of the piston 74 is such that when the speed control spool 36 is in the second speed position as shown in FIG. 3, the right-hand end of the speed control spool 36 contacts the inner end of the reduced end portion 74a, so that on further movement of the speed control spool to the right, the piston 74 is moved inwardly of the bore 72 as shown in FIG. 4. During such inward movement of the piston 74, fluid on the right-hand side of the piston 74 may pass to the left-hand side of the piston through a bleed passage 74b formed axially through the piston.

The bore 71 is connected through a spring pressed relief valve 75 with a line 76, and the bore 72 is connected by a spring pressed relief valve 77 with the line 76. The relief valve 75 is set to open at a higher pressure than the relief valve 77.

The line 76 is connected at the opposite end to the passage 60 through which the high pressure fluid from the pumps passes to drive the motors 13 and 14. Should the load on the hydraulic motors 13 and 14 suddenly increase, as may occur when the truck starts up a steep incline, the pressure in the passage 60 will of course suddenly increase. If this pressure approaches that at which the engine 19 would be overloaded when the speed control spool 36 is in the high speed position shown in FIG. 4, this pressure will be transmitted through the line 76 causing relief valve 77 to open whereby fluid pressure is applied to the piston 74 to move the piston 74 to the left. As the piston 74 moves to the left, it forces the speed control spool 36 to the left against the pressure in the space 52, until the speed control spool 36 is in the second speed position as shown in FIG. 3, whereby the mechanical advantage between the engine and the hydraulic motors is increased to prevent overloading of the engine 19.

If the pressure in the passage 60 approaches a value that would overload the engine 19 when the speed control spool 36 is in the second position, this pressure will be transmitted through the line 76 causing the pressure relief valve 75 to open whereby fluid pressure is applied to the piston 73 to move the piston 73 to the left. Movement of the piston 73 to the left forces the speed control spool 36 to the left against the pressure in the space 52 until the spool is in the first speed position as shown in FIG. 2, thereby further increasing the mechanical advantage between the engine 19 and the hydraulic motors 13 and 14 to prevent overloading of the engine 19. If the load on the hydraulic motors 13 and 14 then increases to a point that might overload and stall the engine 19, the engine 19 will first slow down so that the pressure in space 52 decreases and the spool 36 is moved to the left by the spring 57, uncovering groove 41 to allow the pressure relief valve 66 to open to relieve the pressure and prevent stalling of the engine.

Thus by this arrangement, if the load on the hydraulic motors 13 and 14 should suddenly increase, as may occur when the truck starts up a steep incline, either piston 74 or 73 will quickly move the speed control spool 36 in a direction to increase the mechanical advantage between the engine and the hydraulic motors to prevent overloading and stalling of the engine.

Referring to FIGS. 1–5, it will be noted that a rod 78 extends through the valve body 40, through the plate 59, into the bore 38 and bears against the inner end of the bore 58 formed in the right-hand end of the speed control spool 36. The rod 78 is connected with the brakes of the vehicle and when the brakes of the vehicle are applied, the rod is moved to the left forcing the speed control spool 36 to the left uncovering the grooves 41, 42 and 43 and finally uncovering a groove 79 formed in the bore 38 to the left of the groove 41, as shown in FIG. 5, so that the fluid from the pumps 10, 11 and 12 may bypass through a line 80, the passage 54, and the cooler 55 to the line 22. This prevents loading up of the engine 19 during braking. This movement of the speed control spool 36 by the rod 78 to a position uncovering the groove 79 is made possible through the provision of a yielding abutment including a plate 81 against which a shoulder 36d on the left-hand end of the speed control spool 36 bears, and a spring 82 which normally presses the plate against a limiting shoulder 38a formed in the bore 38. The opposite end of the spring 82 bears against threaded plug 83 which closes the left-hand end of the bore 38. The spring 82 is stronger than the spring 57 so that the speed control spool 36 is normally held in the position shown in FIG. 1, whereby the groove 79 normally remains covered. However, when sufficient force is applied to the spool 36 by the rod 78, the force of the spring 82 is overcome, allowing the speed control spool 36 to be moved to the left to uncover the groove 79.

The left-hand end of the enlarged portion 36b of the speed control spool 36 is provided with a bevel 36e, and when the spool 36 is moved to the left to uncover the groove 79, the bevelled end 36e of the enlarged portion 36b covers the groove 51 restricting the flow of fluid through the passage 50. As the hydraulic motors 13 and 14 act as pumps during braking to pump fluid through the passage 50, restriction of the groove 51 by the bevelled end 36e provides a braking effect through the motors 13 and 14, in addition to that supplied by the truck's brakes. To provide proper charging of the motors 13 and 14 to insure that the motors do not run dry when they are acting as pumps during braking or coasting, a passage 84 is provided connecting a passage 85 with the passage 60. The passage 85 is connected to the space 52 and when the hydraulic motors 13 and 14 are acting as pumps, fluid under pressure therefore flows through the passage 84 by unseating of a check valve 86, as shown in FIG. 5, to insure proper charging of the motors to prevent the motors from running dry.

A groove 87 is formed in the right-hand end of the bore 39 of the reversing spool 36 which is connected by a passage 88 with a groove 89 formed in the right-hand end of the bore 38 of the speed control spool 36. The groove 89 in turn is connected through a line 90 with the line 22, whereby leakage of fluid from the right-hand end of the bore 39 and fluid on the right-hand side of the spool 36 may be returned to the reservoir 23 as the spool is moved to the right by the fluid pressure in the space 52.

Preferably the line 90 is provided with a restriction 91 so that the flow of fluid from the right-hand end of the bore 38 as the spool 36 moves to the right is restricted to slow down the movement of the spool 36 to the right by the pressure in the space 52 and prevent too rapid an acceleration of the truck.

A chamber 85a is provided at the left-hand end of the bore 39 and communicates with the passage 85 whereby leakage from the left-hand end of the bore 39 is recirculated.

Referring now to FIGS. 6 and 7, there is shown a slightly modified form of the invention. In this form of the invention, the third pump 12, shown in FIGS. 1–5, has been eliminated and the two hydraulic motors 13 and 14, shown in FIGS. 1–5, have been replaced by a variable displacement motor 92 having a control lever 93 through which the displacement of the motor may be varied by operation of a servo motor 94, which is connected to the control lever 93 by a connecting rod 95.

As will be described in detail hereafter, the servo motor 94 is operated by the same fluid pressure used to move the speed control spool 36, and to this end, the right-hand end of the servo motor 94 is connected by a line 96 to the chamber 85a which communicates with the space 52, whereby the fluid pressure in space 52 also acts on the right-hand side of the piston 97 of the servo motor 94. This pressure acting on the piston 97, however, is ineffective to move the piston 97 to the left to vary the displacement of the motor 92 unless a spring pressed check valve 98, provided in the left-hand end of the servo motor, is opened to allow fluid trapped on the left-hand side of the piston 97 to flow to the right-hand side of the piston 97 through a line 99. The check valve 98 is adapted to be opened by a pilot piston 100 which is also mounted in the end of the servo motor 94 and is connected by a line 101 with the passage 67 through which fluid under pressure from the second pump 11 is delivered to the hydraulic motor. The check valve 98 is therefore opened only when the pump 11 is connected to drive the motor 94. At all other times, the piston 97 is locked in the position shown in FIG. 6 by the fluid trapped on the left-hand side of the piston 97 by the check valve 98, so that the hydraulic motor 92 is held at maximum displacement.

In FIG. 6, the speed control valve 36 is shown moved by pressure in the space 52 to the first speed position in which the groove 41 is covered by the enlarged portion 36b of the spool so that only fluid from the first pump 10 is supplied to drive the motor 92, and a high mechanical advantage is provided between the engine 19 and the motor 92 to start the truck moving. At this time, the hydraulic motor 92 is held in the position of maximum displacement by the servo motor 94. The fluid from the pumps 10 and 11 circulates as shown by the arrows.

If the speed of the engine 19 is thereafter increased, the pressure in the space 52 increases, moving the speed control spool 36 further to the right until it covers the groove 42 as shown in FIG. 7. When the groove 42 is covered, fluid is supplied from both pumps 10 and 11 to drive the motor 92, as indicated by the arrows in FIG. 7, so that the mechanical advantage between the engine 19 and the motor 92 is decreased with resulting increase in the speed of the motor 92.

At the same time, fluid pressure from the pump 11 is applied through line 101 against the pilot piston 100, causing movement of the pilot piston 100 to open the spring pressed ball check 98, as shown in FIG. 7. The opening of the ball check 98 allows flow of fluid through the line 99 from the left-hand side of the piston 97 of the servo motor 94 to the right-hand side of the piston 97. Piston 97 is therefore released for movement to the left by fluid pressure acting through line 96 on the right-hand side of the piston 97.

It will be noted that the maximum pressure exerted on the piston 97 through the line 96 is determined by the setting of the pressure relief valve 56a. On the other hand, the reaction force exerted by the hydraulic motor 92 on the piston 97, through the control lever 93 and connecting rod 95, is dependent on the load on the motor 92 at the particular time. The area of the piston 97 and the characteristics of a spring 102 provided in the servo motor 94 and acting to urge the piston to the right, are so related to the pressure exerted on the piston 97 through the line 96, that during normal loads on the hydraulic motor 92, the pressure acting on the piston 97 through the line 96 is sufficient to overcome the force of the spring 102 and the reaction of the motor 94 to move the piston 97 to the left to decrease the displacement of the motor 92 when the check valve 98 is opened. The movement of the piston 97 to the left is regulated by the flow of fluid from the left-hand side of the piston 97 to the right-hand side of the piston through a restriction 103 provided in the line 99, so that the displacement of the hydraulic motor 92 is decreased smoothly and gradually.

On the other hand, if the load on the hydraulic motor 92 approaches a value which might stall the engine 19, the force exerted on the piston 97 by the pressure acting through line 96 is not sufficient to overcome the increased reaction on the hydraulic motor 92 and the force of the spring 102, so that the piston 97 is moved to the right, whereby the displacement of the motor 92 and the mechanical advantage between the engine 19 and the motor 92 is increased to prevent stalling of the engine 19.

Thus, assuming no overload on the motor 92, when the speed control spool 36 is moved by the pressure in the space 52 to a point covering the groove 42, as shown in FIG. 7, the mechanical advantage between the engine 19 and the hydraulic motor 92 is first decreased by the increase in volume of fluid supplied to the motor 92 by connecting the pump 11 with the motor 92, and the mechanical advantage then further decreased by the decrease in the displacement of the motor 92 by movement of piston 97 of the servo motor 94 to the left.

If there should be a sudden increase in the load on the motor 92 to the extent that the engine 19 might stall when the motor 92 is at minimum displacement as shown in FIG. 7, the increased reaction on the hydraulic motor 92 is immediately transmitted to the piston 97 through the control lever 93, and connecting rod 95, causing piston 97 to move to the right to increase the displacement of the motor 92 and increase the mechanical advantage between the engine 19 and the motor 92 to prevent stalling of the engine.

If the load on the motor 92 is still such that it might overload and cause stalling of the engine 19, the check valve 75 will open admitting fluid under pressure to the small piston 73 causing the piston 73 to move to the left and thereby move the speed control spool 36 from the second speed position to the first speed position, to further increase the mechanical advantage between the engine 19 and the motor 92. As the spool 36 is moved to the left by the small piston 71, the groove 42 is uncovered so that pressure on the line 101 is relieved, allowing the check valve 98 to close to trap fluid on the left-hand side of the piston 97 of the servo motor 94 to hold the piston 97 in the position shown in FIG. 6 in which the motor 92 is at maximum displacement.

In the form of the invention shown in FIG. 7, the check valve 77 and the piston 74 are inoperative because the third pump 12 is not utilized. The piston 74, however, is used as a stop for limiting movement of the speed control spool 36 to the left by providing a blocking member 104 behind the piston 74 to hold the piston extended as shown in FIGS. 6 and 7.

During braking, the rod 78 functions in the same manner as described in conjunction with the form of the invention as shown in FIGS. 1–5 to move the speed control spool 36 to the left to allow fluid from the pumps 10 and 11 to be bypassed through groove 79 and passage 80 and to restrict the flow of fluid from the motor 92 through passage 50 and groove 51 to provide braking effect.

Referring now to FIGS. 8–11, there is shown still another form of the invention. In this form of the invention, the bore 38 in which the speed control spool 36 operates is elongated, and a second spool 105 is slidably mounted in the bore 38 between the speed control spool 36 and the pistons 73 and 74. The spool 105 is adapted to be moved to the right by the speed control spool 36, against the force of the spring 57, by fluid pressure in space 52 acting against the left-hand end of the enlarged portion 36b of the speed control spool 36. As will be described in detail hereafter, the spool 105 serves to change the connection of the two hydraulic motors 13 and 14 from parallel to series during high speed operation of the motors.

This form of the invention also includes a shuttle valve 106, mounted in a bore 107, which serves to equalize the pressure drop across the two motors 13 and 14, when the two motors are connected in series and operating at different speeds, as when the truck turns a corner. In order to allow connecting of the motors 13 and 14 in either parallel or series, a slightly different reversing spool 108 is used. In FIGS. 8–11, the reversing spool 108 is shown in a drive position.

As in the form of the invention shown in FIGS. 1–5, when the speed of the engine 19 is increased above the idling speed, pressure builds up in the space 52 moving the speed control spool 36 and the spool 105 to the right against the force of the spring 57.

In FIG. 8, the speed control spool is shown moved to the first speed position in which the enlarged portion 36b of the speed control spool 36 has covered the groove 41, and fluid under pressure to drive the motors 13 and 14 is supplied only by the first pump 10 so that a high mechanical advantage is provided between the engine 19 and the motors 13 and 14 to start the truck moving.

At this time, the spool 105 is in a position connecting the hydraulic motors 13 and 14 in parallel, with the fluid from the pump 10 being supplied to the motor 13 by a circuit formed by line 24, groove 41, passage 60, a groove 109 in a bore 110 for the reversing spool 108, an elongated groove 111 in the reversing spool 108, a groove 112 formed in the bore 110, a line 113 connecting the groove 112 with the motor 13, a line 114 connecting the motor 13 with a groove 115 formed in the bore 110, an elongated groove 116 formed in the spool 108, a groove 117 formed in the bore 110, a line 118 connecting groove 117 and a groove 119 formed in the bore 38, a groove 120 formed in the spool 105, a groove 121 formed in the bore 38 spaced axially to the left of the groove 119, a passage 122, a passage 123 which connects with passage 50, groove 51 at the left-hand end of the bore 38, space 52, groove 53, passage 54, restriction 56, cooler 55 and line 22.

At the same time, fluid from the pump 10 is supplied to the motor 14 by a parallel circuit formed by passage 60, a line 124, the bore 107 for the shuttle valve 106, a groove 125 formed in the left-hand end of the bore 107, a passage 126 connecting groove 125 and a groove 127 formed in the bore 38 to the right of the grooves 121 and 119, an elongated groove 128 formed in the spool 105, a passage 129 connecting the groove 127 with a groove 130 formed in the bore 110 of the reversing spool 108, an elongated groove 131 formed in the reversing spool 108, a groove 132 formed in the bore 110 of the reversing spool 108, a line 133 connecting the groove 132 with the motor 14, a line 134 connecting the opposite side of the motor 14 to a groove 135 formed in the bore 110 of the reversing spool 108, an elongated groove 137 formed in the reversing spool 108, a groove 136 in the bore 110, line 123, passage 50, groove 51, space 52, groove 53, passage 54, restriction 56, cooler 55 and line 22.

At this time, fluid from the pump 11 bypasses the motors 13 and 14 through groove 45 in the speed control spool 36, groove 44 in the bore 38, and a passage 139 which is connected to the passage 122 whereby the fluid is circulated with the return fluid from the motor 13. Thus in the position of the speed control spool 36 and the spool 105, as shown in FIG. 8, fluid is supplied from the first pump 10 through parallel circuits to the motors 13 and 14, with the fluid circulating as shown by the arrows.

If at this time, the speed of the engine 19 is further increased so that the fluid pressure in the space 52 is increased, the speed control spool 36 and the spool 105 will be moved further to the right until the groove 42 is covered by the enlarged portion 36b of the spool 36, as shown in FIG. 9. When the groove 42 is covered, fluid from the second pump 11 flows through passage 67 into passage 60 by opening of check valve 68. Fluid is therefore supplied from both pumps 10 and 11 to drive the hydraulic motors 13 and 14 and the mechanical advantage between the engine 19 and the hydraulic motors 13 and 14 decreased, with resulting increase in the speed of the motors. In the position of spool 105, as shown in FIG. 9, the two motors 13 and 14 are still connected in parallel, as previously described in connection with FIG. 8 so that the fluid circulates as indicated by the arrows in FIG. 9.

If the speed of the engine is then further increased so that the pressure in the space 52 is further increased, the speed control spool 36 and the spool 105 will be moved further to the right to the position shown in FIG. 10. As will be described in detail hereafter, in this position of the spool 105, fluid under pressure is supplied to the right-hand end of the bore 107 of shuttle valve 106, through a passage 140 which connects the bore 107 with a groove 141 formed in bore 38, causing the shuttle valve 106 to move to the left from the position shown in FIG. 9 to the centered position shown in FIG. 10. With the shuttle valve 106 and the spool 105 in the positions shown in FIG. 10, and assuming that the truck is operating straight ahead, the motors 13 and 14 are connected in series, with the fluid from the two pumps 10 and 11 circulating as indicated by the arrows, through a circuit formed by passage 60, groove 109 in the bore 110 of the spool 108, the groove 111 in the spool 108, the groove 112 formed in the bore 110, the line 113, the motor 13, the line 114, the groove 115, elongated groove 116 in the spool 108, groove 117, passage 118, groove 119 in the bore 38, elongated groove 120 in the spool 105, groove 127, line 129, groove 130 in the bore 110 of the reversing spool 108, elongated groove 131 in the reversing spool 108, groove 132, line 133, hydraulic motor 14, line 134, groove 135, elongated groove 137, groove 136, line 123, groove 51, space 52, passage 54, restriction 56, cooler 55 and line 22.

With the hydraulic motors 13 and 14 thus connected in series, the mechanical advantage between the engine 19 and the motors is further decreased with resulting increase in the speed of the motors. An important advantage of changing the connection of the motors from parallel to series is that the series connected motors require one-half the fluid velocity at twice the fluid pressure to obtain a given truck speed than would parallel connected motors for the same truck speed. By thus reducing the velocity of the fluid at high speed, heating of the fluid is materially reduced with a resulting increase in efficiency. Further, the hydraulic motors operate more efficiently because they operate at hydraulic pressures nearer that to which they were designed to operate.

At this point, it should be noted that the shuttle valve 106 is actually formed in two parts 106a and 106b. The cross sectional area of the left-hand end of the part 106a is exactly one-half the area of the right-hand end of the part 106b. A spring 106c is mounted in a bore 106d formed in the part 106a and normally urges the two parts away from each other. The part 106b is provided with a bleed passage 106e extending axially therethrough. This arrangement allows passage of oil from one side to the other of the part 106b to permit free movement of the parts 106a and 106b as a single hydraulic unit. It will be appreciated that during straight ahead driving and with the motors 13 and 14 connected in series, that fluid pressure acting through the line 124 on the left-hand end of the part 106a will be twice that acting on the right-hand end of the part 106b through a passage 140. However, as the cross sectional area of the part 106a is exactly one-half that of the part 106b, the forces exerted on the ends of the valve 106 at this time are balanced so that valve 106 remains in the position shown in FIG. 10.

Assuming now that the truck is operating at top speed with the hydraulic motors connected in series, as shown in FIG. 10, and that the truck is steered around a corner so that hydraulic motor 13 is caused to operate at a lower speed than the hydraulic motor 14, the fluid pressure on the high pressure side of the motor 13 will be greater than one-half of that on the high pressure side of the motor 14. As the fluid pressure exerted on the left-hand end of the part 106a of the shuttle valve 106 through line 124 is the same as the fluid pressure on the high pressure side of the motor 13, and the pressure exerted on the right-hand end of the port 106b of the shuttle valve 106 through the passage 140 is the same as the fluid pressure on the high pressure side of the motor 14, the forces exerted on each side of the valve 106 become unbalanced with the result that the shuttle valve 106 moves to the right to the position shown in broken lines in FIG. 11, uncovering groove 125. As the groove 125 is uncovered, high pressure fluid from line 124 is admitted through line 126 and line 129 to the hydraulic motor 14 until the pressure on the hydraulic motor 14 is equal to one-half that on the hydraulic motor 13. When the hydraulic pressure on the motor 14 becomes one-half of the pressure on the motor 13, so that the pressure drop across each motor is equalized, the shuttle valve 106 moves back to the position shown in FIG. 10. In this manner, a differential effect is provided between the hydraulic motors 13 and 14.

If on the other hand, the truck should turn a corner in the opposite direction, so that motor 14 is caused to operate at a lower speed than the motor 13, the pressure on the high pressure side of the motor 14 will increase to a value of more than one-half of that on the high pressure side of the motor 13. This pressure on the motor 14 will be transmitted through the line 129 and line 140 to the right-hand end of the part 106b of the shuttle valve 106 causing an unbalanced force on the valve 106 so that the valve 106 moves to the left until groove 142 formed in the bore 107 is uncovered, as shown in solid lines in FIG. 11. The groove 142 is connected by line 143 with the line 22, so that the uncovering of the groove 142 allows the pressure on the hydraulic motor 14 to reduce until it is equal to one-half the pressure on the motor 13. When the pressure on the hydraulic motor 14 becomes equal to one-half of the pressure on the motor 13, the forces on the shuttle valve 106 again become unbalanced and the shuttle valve again moves to the position shown in FIG. 10.

If the load on the hydraulic motors 13 and 14 should suddenly increase to a point approaching a value at which the engine 19 would be overloaded when the spool 36 and the spool 105 are in the position shown in FIG. 10, the pressure in the passage 60, will of course increase. This increase in pressure is transmitted through line 76 causing valve 77 to open. When valve 77 opens, fluid under pressure is applied to the small piston 74 causing the piston to move to the left. Movement of the small piston 74 to the left forces the spool 105 and the spool 36 to the second speed position, as shown in FIG. 9, whereby the mechanical advantage between the engine 19 and the hydraulic motors 13 and 14 is increased to prevent overloading and stalling of the engine.

If the load on the hydraulic motors 13 and 14 is still such that the engine 19 might be overloaded and stall, the valve 75 opens under the pressure applied thereto through line 76, so that fluid is applied to the piston 73 causing the piston 73 to move to the left. Movement of the small piston 73 to the left forces the spool 105 and spool 36 to the first speed position shown in FIG. 8, whereby the mechanical advantage between the engine 19 and the hydraulic motors 13 and 14 is further increased to prevent overloading and stalling of the engine 19.

If the load on the hydraulic motors 13 and 14 is still such that the engine might overload and stall when the spool 36 is in the position shown in FIG. 8, the engine 19 will first slow down so that the pressure in the space 52 decreases, and the spool 36 will be moved to the left by the spring 57, uncovering groove 41 to allow the pressure relief valve 66 to open and relieve the pressure and prevent stalling of the engine 19.

During braking, the rod 73 functions in the same manner as described in conjunction with the form of the invention as shown in FIGS. 1–5, to move the speed control spool 36 to the left to allow fluid from the pumps 10 and 11 to be bypassed through groove 79 and passage 80 and to restrict the flow of fluid from the motors 13 and 14 through passage 50 and groove 51 to provide a braking effect.

From the preceding description, it can be seen that there is provided a relatively simple, inexpensive hydraulic drive which allows the operator of the truck to smoothly bring the truck from a standstill position to high speed solely through operation of the accelerator of the engine. While certain forms of the invention have been shown and described, it will be appreciated that this is for the purpose of illustration and that changes and modifications may be made therein without departing from the spirit and scope of the invention.

I now claim:

1. A hydraulic drive for an industrial truck comprising, an engine,
a driver operated engine throttle control element effective to control the speed of said engine,
hydraulic pump means driven by said engine,
hydraulic motor means connected with traction wheels of the truck and adapted to be driven by fluid supplied by said hydraulic pump means,
control means responsive to increases in the speed of the engine to increase the volume of fluid supplied to said hydraulic motor means by said hydraulic pump means as the speed of the engine is increased, whereby to decrease the mechanical advantage between the engine and the hydraulic motor means and increase the speed of the hydraulic motor means, and
means responsive to a predetermined load on the hydraulic motor means for overruling said control means to decrease the volume of fluid supplied to the hydraulic motor means by the hydraulic pump means whereby to increase the mechanical advantage between the engine and the hydraulic motor means and prevent overloading and stalling of the engine.

2. A hydraulic drive for an industrial truck comprising, an engine,
hydraulic pump means driven by said engine,
hydraulic motor means connected with traction wheels of the truck and adapted to be driven by fluid supplied by said hydraulic pump means,
control means responsive to increases in the speed of the engine to increase the volume of fluid supplied to said hydraulic motor means by said hydraulic pump means as the speed of the engine is increased, whereby to decrease the mechanical advantage between the engine and the hydraulic motor means and increase the speed of the hydraulic motor means,
means responsive to a predetermined load on the hydraulic motor means for overruling said control means to decrease the volume of fluid supplied to the hydraulic motor means by the hydraulic pump means whereby to increase the mechanical advantage between the engine and the hydraulic motor means and prevent overloading and stalling of the engine, and
means for restricting the flow of fluid from the hydraulic motor means when said hydraulic motor means are acting as pumps whereby to provide the braking action through said hydraulic motor means.

3. A hydraulic drive for an industrial truck comprising, an engine,
hydraulic pump means driven by said engine,
hydraulic motor means connected with traction wheels of the truck and adapted to be driven by fluid supplied by said hydraulic pump means,
control means responsive to increases in the speed of the engine to increase the volume of fluid supplied to said hydraulic motor means by said hydraulic pump means as the speed of the engine is increased, whereby to decrease the mechanical advantage between the engine and the hydraulic motor means and increase the speed of the hydraulic motor means,
means responsive to a predetermined load on the hydraulic motor means for overruling said control means to decrease the volume of fluid supplied to the hydraulic motor means by the hydraulic pump means whereby to increase the mechanical advantage between the engine and the hydraulic motor means and prevent overloading and stalling of the engine, and
means for bypassing fluid from said pumps and for restricting the flow of fluid from said hydraulic motor means when said hydraulic motor means are acting as pumps to provide a braking action.

4. A hydraulic drive for an industrial truck comprising, an engine,
hydraulic pump means driven by said engine,
variable displacement hydraulic motor means connected with traction wheels of the truck and adapted to be driven by fluid from said hydraulic pump means,
control means responsive to increases in the speed of the engine to increase the volume of fluid supplied to said hydraulic motor means by said hydraulic pump means and to decrease the displacement of said variable displacement hydraulic motor means as the speed of the engine is increased, whereby to decrease the mechanical advantage between the engine and the hydraulic motor means and increase the speed of the hydraulic motor means, and
means responsive to a predetermined load on the hydraulic motor means for overruling said control means to decrease the volume of fluid supplied to the hydraulic motor means by the hydraulic pump means and to increase the displacement of said hydraulic motor means whereby to increase the mechanical advantage between the engine and the hydraulic motor means and prevent overloading and stalling of the engine.

5. A hydraulic drive for an industrial truck comprising, an engine,
hydraulic pump means driven by said engine,
variable displacement hydraulic motor means connected with traction wheels of the truck and adapted to be driven by fluid from said hydraulic pump means,
control means responsive to increases in the speed of the engine to increase the volume of fluid supplied to said hydraulic motor means by said hydraulic pump means and to decrease the displacement of said variable displacement hydraulic motor means as the speed of the engine is increased, whereby to decrease the mechanical advantage between the engine and the hydraulic motor means and increase the speed of the hydraulic motor means,
means responsive to a predetermined load on the hydraulic motor means for overruling said control means to decrease the volume of fluid supplied to the hydraulic motor means by the hydraulic pump means and to increase the displacement of said hydraulic motor means whereby to increase the mechanical advantage between the engine and the hydraulic motor means and prevent overloading and stalling of the engine, and means for restricting the flow of fluid from the hydraulic motor means when said hydraulic motor means are acting as pumps whereby to provide the braking action through said hydraulic motor means.

6. A hydraulic drive for an industrial truck comprising, an engine, hydraulic pump means driven by said engine, variable displacement hydraulic motor means connected with traction wheels of the truck and adapted to be driven by fluid from said hydraulic pump means, control means responsive to increases in the speed of the engine to increase the volume of fluid supplied to said hydraulic motor means by said hydraulic pump means and to decrease the displacement of said variable displacement hydraulic motor means as the speed of the engine is increased, whereby to decrease the mechanical advantage between the engine and the hydraulic motor means and increase the speed of the hydraulic motor means, means responsive to a predetermined load on the hydraulic motor means for overruling said control means to decrease the volume of fluid supplied to the hydraulic motor means by the hydraulic pump means and to increase the displacement of said hydraulic motor means whereby to increase the mechanical advantage the engine and the hydraulic motor means and prevent overloading and stalling of the engine, and means for bypassing fluid from said pumps and for restricting the flow of fluid from said hydraulic motor means when said hydraulic motor means are acting as pumps to provide a braking action.

7. A hydraulic drive for an industrial truck comprising, an engine, hydraulic pump means driven by said engine, two hydraulic motor means connected with traction wheels of the truck and adapted to be driven by fluid supplied by said hydraulic pump means, control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means, and means responsive to a predetermined load on the hydraulic motor means for overruling said control means to decrease the volume of fluid supplied to the hydraulic motor means by the hydraulic pump means and to change the connection of the hydraulic motor means from series to parallel whereby to increase the mechanical advantage between the engine and the hydraulic motor means and prevent overloading and stalling of the engine.

8. A hydraulic drive for an industrial truck comprising, an engine, hydraulic pump means driven by said engine, two hydraulic motor means connected with traction wheels of the truck and adapted to be driven by fluid supplied by said hydraulic pump means, control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means, means responsive to a predetermined load on the hydraulic motor means for overruling said control means to decrease the volume of fluid supplied to the hydraulic motor means by the hydraulic pump means and to change the connection of the hydraulic motor means from series to parallel whereby to increase the mechanical advantage between the engine and the hydraulic motor means and prevent overloading and stalling of the engine, and means for restricting the flow of fluid from the hydraulic motor means when said hydraulic motor means are acting as pumps whereby to provide the braking action through said hydraulic motor means.

9. A hydraulic drive for an industrial truck comprising, an engine, hydraulic pump means driven by said engine, two hydraulic motor means connected with traction wheels of the truck and adapted to be driven by fluid supplied by said hydraulic pump means, control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means, means responsive to a predetermined load on the hydraulic motor means for overruling said control means to decrease the volume of fluid supplied to the hydraulic motor means by the hydraulic pump means and to change the connection of the hydraulic motor means from series to parallel whereby to increase the mechanical advantage between the engine and the hydraulic motor means and prevent overloading and stalling of the engine, and means for bypassing fluid from said pumps and for restricting the flow of fluid from said hydraulic motor means when said hydraulic motor means are acting as pumps to provide a braking action.

10. A hydraulic drive for an industrial truck comprising, an engine, hydraulic pump means driven by said engine, two hydraulic motor means connected with traction wheels of the truck and adapted to be driven by fluid supplied by said hydraulic pump means, control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means, means responsive to a predetermined load on the hydraulic motor means for overruling said control means to decrease the volume of fluid supplied to the hydraulic motor means by the hydraulic pump means and to change the connection of the hydraulic motor means from series to parallel whereby to increase the mechanical advantage between the engine and the hydraulic motor means and prevent overloading and stalling of the engine, and means for equalizing the pressure drop across the two hydraulic motors when the hydraulic motors are connected in series.

11. A hydraulic drive for an industrial truck comprising,
an engine,
hydraulic pump means driven by said engine,
two hydraulic motor means connected with traction wheels of the truck and adapted to be driven by fluid supplied by said hydraulic pump means,
control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means,
means responsive to a predetermined load on the hydraulic motor means for overruling said control means to decrease the volume of fluid supplied to the hydraulic motor means by the hydraulic pump means and to change the connection of the hydraulic motor means from series to parallel whereby to increase the mechanical advantage between the engine and the hydraulic motor means and prevent overloading and stalling of the engine,
means for equalizing the pressure drop across the two hydraulic motor means when the hydraulic motor means are connected in series, and
means for bypassing fluid from said pumps and for restricting the flow of fluid from said hydraulic motor means when said hydraulic motor means are acting as pumps to provide a braking action.

12. A hydraulic drive for an industrial truck comprising,
an engine,
hydraulic pump means driven by said engine,
hydraulic motor means connected with traction wheels of the truck and adapted to be driven by fluid supplied by said hydraulic pump means,
means for creating hydraulic pressure proportional to increases in the speed of the engine,
control means responsive to increases in said hydraulic pressure to increase the volume of fluid supplied to said hydraulic motor means by said hydraulic pump means whereby to decrease the mechanical advantage between the engine and the hydraulic motor means and increase the speed of the hydraulic motor means, and
means responsive to a predetermined load on the hydraulic motor means for overruling said control means to decrease the volume of fluid supplied to the hydraulic motor means by the hydraulic pump means whereby to increase the mechanical advantage between the engine and the hydraulic motor means and prevent overloading and stalling of the engine.

13. A hydraulic drive for an industrial truck comprising,
an engine,
hydraulic pump means driven by said engine,
hydraulic motor means connected with traction wheels of the truck and adapted to be driven by fluid supplied by said hydraulic pump means,
conduit means for returning fluid from said pump means and hydraulic motor means,
means for creating fluid pressure in said conduit means proportional to the rate of flow of said return fluid whereby said fluid pressure in said conduit means is proportional to the speed of the engine,
control means responsive to increases in said fluid pressure in said conduit means to increase the volume of fluid supplied to said hydraulic motor means by said hydraulic pump means as the speed of the engine is increased whereby to decrease the mechanical advantage between the engine and the hydraulic motor means and increase the speed of the hydraulic motor means, and
means responsive to a predetermined load on the hydraulic motor means for overruling said control means to decrease the flow of fluid to the hydraulic motor means by the hydraulic pump means whereby to increase the mechanical advantage between the engine and the hydraulic motor means to prevent overloading and stalling of the engine.

14. A hydraulic drive for an industrial truck comprising,
an engine,
hydraulic pump means driven by said engine,
hydraulic motor means connected with traction wheels of the truck and adapted to be driven by fluid supplied by said hydraulic pump means,
conduit means for returning fluid from said pump means and hydraulic motor means,
means for creating fluid pressure in said conduit means proportional to the rate of flow of said return fluid whereby said pressure in said conduit means increases as the speed of the engine increases,
valve means responsive to increases in said fluid pressure in said conduit means to increase the volume of fluid supplied to said hydraulic motor means by said hydraulic pump means as the speed of the engine is increased whereby to decrease the mechanical advantage between the engine and the hydraulic motor means and increase the speed of the hydraulic motor means, and
means responsive to a predetermined load on the hydraulic motor means for overruling said valve means to decrease the flow of fluid to the hydraulic motor means by the hydraulic pump means to increase the mechanical advantage between the engine and the hydraulic motor means to prevent overloading and stalling of the engine.

15. A hydraulic drive for industrial truck comprising an engine,
two hydraulic pump means driven by said engine,
hydraulic motor means connected with traction wheels of the truck and adapted to be driven by fluid supplied by said hydraulic pump means,
conduit means for returning fluid from said pump means and said hydraulic motor means,
means for creating fluid pressure in said conduit means proportional to the rate of flow of fluid through said conduit means, whereby said fluid pressure increases as the speed of the engine increases,
valve means responsive to increases in fluid pressure in said conduit means for first connecting one of said pump means to said hydraulic motor means and then connecting the other said pump means to said hydraulic motor means as the fluid pressure in said conduit means increases whereby to decrease the mechanical advantage between the engine and the hydraulic motor means and increase the speed of the hydraulic motor means, and
means responsive to a predetermined load on the hydraulic motor means for overruling said valve means to decrease the volume of fluid supplied to the hydraulic motor means by said hydraulic pump means whereby to increase the mechanical advantage between the engine and the hydraulic motor means and prevent overloading and stalling of the engine.

16. A hydraulic drive for industrial truck comprising an engine,
two hydraulic pump means driven by said engine,
variable displacement hydraulic motor means connected with traction wheels of the truck and adapted to be driven by fluid supplied by said hydraulic pump means,
a hydraulic servo motor for varying the displacement of said hydraulic motor means, conduit means for returning fluid from said pump means and said hydraulic motor means, means for creating fluid pressure in said conduit means proportional to the rate of flow of fluid through said conduit means whereby said fluid pressure increases as the speed of the engine increases, valve means responsive to increases in fluid pressure in said conduit means for first connecting one of said pump means to said hydraulic motor means and then connecting the other said pump means to said hydraulic motor means as the fluid pressure in said conduit means increases whereby to decrease the mechanical advantage between the engine and the hydraulic motor means and increase the speed of the hydraulic motor means, control means responsive to the connection of said second pump means to said hydraulic motor means for applying said fluid pressure in said conduit means to said servo motor to operate said servo motor means to decrease the displacement of said hydraulic motor means, and means responsive to a predetermined load on the hydraulic motor means for overruling said valve means to decrease the volume of fluid supplied to the hydraulic motor means by the hydraulic pump means whereby to increase the mechanical advantage to the engine and the hydraulic motor means and prevent overloading and stalling of the engine.

17. A hydraulic drive for an industrial truck comprising, an engine, two hydraulic pump means driven by said engine, hydraulic motor means connected with traction wheels of the truck and adapted to be driven by fluid supplied by said hydraulic pump means, valve means including a spool movable to connect first one and then both of said pump means to said hydraulic motor means, a chamber at one end of said spool through which return fluid from said pump means and hydraulic motor means circulates, yielding means urging said spool toward said chamber, means for creating fluid pressure in said chamber proportional to the rate of flow of fluid through said chamber, whereby the fluid pressure in said chamber increases as the speed of the engine increases and acts on said spool to move said spool against the force of said yielding means to first connect one pump and then both pumps to said hydraulic motor means to decrease the mechanical advantage between the engine and the hydraulic motor means and increase the speed of the hydraulic motor means, and means responsive to a predetermined load on the hydraulic motor means for moving said spool against the fluid pressure in said chamber to disconnect said pumps from said hydraulic motor means whereby to increase the mechanical advantage between the engine and the hydraulic motor means and prevent overloading and stalling of the engine.

18. A hydraulic drive for an industrial truck comprising an engine, two hydraulic pump means driven by said engine, hydraulic motor means connected with traction wheels of the truck and adapted to be driven by fluid supplied by said hydraulic pump means, valve means including a spool movable to connect first one and then both of said pump means to said hydraulic motor means, a chamber at one end of said spool through which return fluid from said pump means and hydraulic motor means circulates, yielding means urging said spool toward said chamber, means for creating fluid pressure in said chamber proportional to the rate of flow of fluid through said chamber, whereby the fluid pressure in said chamber increases as the speed of the engine increases and acts on said spool to move said spool against the force of said yielding means to first connect one pump and then both pumps to said hydraulic motor means, whereby to decrease the mechanical advantage between the engine and the hydraulic motor means and increase the speed of the hydraulic motor means, and piston means connected with the pressure side of said hydraulic motor means and movable by a predetermined pressure on said hydraulic motor means to move said spool against the pressure in said chamber to disconnect said pump means from said hydraulic motor means whereby to increase the mechanical advantage between the engine and the hydraulic motor means and prevent overloading and stalling of the engine.

19. A hydraulic drive for an industrial truck comprising, an engine, two hydraulic pump means driven by said engine, hydraulic motor means connected with traction wheels of the truck and adapted to be driven by fluid supplied by said hydraulic pump means, valve means including a spool movable in one direction to connect first one and then both of said pump means to said hydraulic motor means and movable in the opposite direction to bypass fluid from said pump means and to restrict flow of fluid from said hydraulic motor means, a chamber at one end of said spool means through which return fluid from said pump means and hydraulic motor means circulates, yielding means urging said spool toward said chamber, means for creating fluid pressure in said chamber proportional to the rate of flow of fluid through said chamber, whereby the fluid pressure in said chamber increases as the speed of the engine increases and acts on said spool to move said spool in said one direction against the force of said yielding means to first connect one pump and then both pumps to said hydraulic motor means, whereby to decrease the mechanical advantage between the engine and the hydraulic motor means and increase the speed of the hydraulic motor means, means responsive to a predetermined load on the hydraulic motor means for moving said spool against the fluid pressure in said chamber to disconnect said pumps from said hydraulic motor means whereby to increase the mechanical advantage between the engine and the hydraulic motor means and prevent overloading and stalling of the engine, and means for moving said spool in said opposite direction to bypass fluid from said pump means and restrict flow of fluid from said hydraulic motor means to provide a braking effect.

20. A hydraulic drive for an industrial truck comprising, an engine, two hydraulic pump means driven by said engine, a variable displacement hydraulic motor means connected with traction wheels of the truck and adapted to be driven by fluid supplied by said hydraulic pump means, a servo motor for changing the displacement of said hydraulic motor means, valve means including a spool movable to connect first one and then both of said pump means to said hydraulic motor means, a chamber at one end of said spool through which return fluid from said pump means and hydraulic motor means circulates, yielding means urging said spool toward said chamber, means for creating fluid pressure in said chamber proportional to the rate of flow of fluid through said chamber, whereby the fluid pressure in said chamber increases as the speed of the engine increases and acts on said spool to move said spool against the force of said yielding means to first connect one pump and then both pumps to said hydraulic motor means to decrease the mechanical advantage between the engine and the hydraulic motor means and increase the speed of the hydraulic motor means, means for applying said fluid pressure in said chamber to said servo motor means to actuate said servo motor means to decrease the displacement of said hydraulic motor means to further decrease the mechanical advantage between said engine and said hydraulic motor means, and means responsive to a predetermined load on the hydraulic motor means for moving said spool against the fluid pressure in said chamber to disconnect said pumps from said hydraulic motor means whereby to increase the mechanical advantage between the engine and the hydraulic motor means and prevent overloading and stalling of the engine.

21. A hydraulic drive for an industrial truck comprising,
an engine,
two hydraulic pump means driven by said engine,
two hydraulic motor means connected with traction wheels of the truck and adapted to be driven by fluid supplied by said hydraulic pump means,
valve means including a first spool movable to connect first one and then both of said pump means to said hydraulic motor means,
a second spool movable to change the connection of said two hydraulic motor means from parallel to series,
a chamber at one end of said spools through which return fluid from said pump means and hydraulic motor means circulates,
yielding means urging said spools toward said chamber,
means for creating fluid pressure in said chamber proportional to the rate of flow of fluid through said chamber, whereby the fluid pressure in said chamber increases as the speed of the engine increases and acts on said spools to move said spools against the force of said yielding means to first connect one pump and then both pumps to said hydraulic motor means and finally to change the connection of the hydraulic motor means from parallel to series, whereby to decrease the mechanical advantage between the engine and the hydraulic motor means and increase the speed of the hydraulic motor means, and
means responsive to a predetermined load on the hydraulic motor means for moving said spools against the fluid pressure in said chamber to change the connection of said hydraulic motor means from series to parallel and to disconnect said pumps from said hydraulic motor means whereby to increase the mechanical advantage between the engine and the hydraulic motor means and prevent overloading and stalling of the engine.

22. A hydraulic drive for an industrial truck comprising,
an engine,
two hydraulic pump means driven by said engine,
two hydraulic motor means connected with traction wheels of the truck and adapted to be driven by fluid supplied by said hydraulic pump means,
valve means including a first spool movable to connect first one and then both of said pump means to said hydraulic motor means,
a second spool movable to change the connection of said two hydraulic motor means from parallel to series,
a chamber at one end of said spools through which return fluid from said pump means and hydraulic motor means circulates,
yielding means urging said spools toward said chamber,
means for creating fluid pressure in said chamber proportional to the rate of flow of fluid through said chamber, whereby the fluid pressure in said chamber increases as the speed of the engine increases and acts on said spools to move said spools against the force of said yielding means to first connect one pump and then both pumps to said hydraulic motor means and finally to change the connection of the hydraulic motor means from parallel to series, whereby to decrease the mechanical advantage between the engine and the hydraulic motor means and increase the speed of the hydraulic motor means,
means for equalizing the pressure drop across each of said hydraulic motor means when said hydraulic motor means are connected in series, and
means responsive to a predetermined load on the hydraulic motor means for moving said spools against the fluid pressure in said chamber to change the connection of said hydraulic motor means from series to parallel and to disconnect said pumps from said hydraulic motor means whereby to increase the mechanical advantage between the engine and the hydraulic motor means and prevent overloading and stalling of the engine.

23. A hydraulic drive for an industrial truck comprising,
an engine,
a driver operated engine throttle control element effective to control the speed of said engine,
hydraulic pump means driven by said engine,
hydraulic motor means connected with traction wheels of the truck and adapted to be driven by fluid supplied by said hydraulic pump means, and
control means responsive to increases in the speed of the engine to increase the volume of fluid supplied to said hydraulic motor means by said hydraulic pump means as the speed of the engine is increased, whereby to decrease the mechanical advantage between the engine and the hydraulic motor means and increase the speed of the hydraulic motor means.

24. A hydraulic drive for an industrial truck comprising,
an engine,
hydraulic pump means driven by said engine,
variable displacement hydraulic motor means connected with traction wheels of the truck and adapted to be driven by fluid from said hydraulic pump means, and
control means responsive to increases in the speed of the engine to increase the volume of fluid supplied to said hydraulic motor means by said hydraulic pump means and to decrease the displacement of said variable displacement hydraulic motor means as the speed of the engine is increased, whereby to decrease the mechanical advantage between the engine and the hydraulic motor means and increase the speed of the hydraulic motor means.

25. A hydraulic drive for an industrial truck comprising,
an engine,
hydraulic pump means driven by said engine,
two hydraulic motor means connected with traction wheels of the truck and adapted to be driven by fluid supplied by said hydraulic pump means, and
control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means.

26. A hydraulic drive for an industrial truck comprising,
an engine,
hydraulic pump means driven by said engine,
two hydraulic motor means connected with traction wheels of the truck and adapted to be driven by fluid supplied by said hydraulic pump means,
control means responsive to increases in the speed of the engine to increase the volume of fluid supplied to said hydraulic motor means by said hydraulic pump means as the speed of the engine is increased and for changing the connection of the hydraulic motor means from parallel to series during high speed operation whereby to decrease the mechanical advantage between the engine and the hydraulic motor means and increase the speed of the hydraulic motor means, and
means for equalizing the pressure drop across the two hydraulic motors when the hydraulic motors are connected in series.

27. A hydraulic drive for an industrial truck comprising,
an engine,
hydraulic pump means driven by said engine,
hydraulic motor means connected with traction wheels of the truck and adapted to be driven by fluid supplied by said hydraulic pump means,
means for creating hydraulic pressure proportional to increases in the speed of the engine, and
control means responsive to increases in hydraulic pressure to first bypass said hydraulic motor, whereby said hydraulic fluid is returned to the suction side of said hydraulic pump means and thereafter an increase in hydraulic pressure is effective to close said bypass, thus providing greater hydraulic pressure to drive said hydraulic motor.

28. A hydraulic drive for an industrial truck comprising,
an engine,
hydraulic pump means driven by said engine,
hydraulic motor means connected with traction wheels of the truck and adapted to be driven by fluid supplied by said hydraulic pump means,
conduit means for returning fluid from said pump means and hydraulic motor means,
means for creating fluid pressure in said conduit means proportional to the rate of flow of said return fluid whereby said fluid pressure in said conduit means is proportional to the speed of the engine, and
control means responsive to increases in said fluid pressure in said conduit means to increase the volume of fluid supplied to said hydraulic motor means by said hydraulic pump means as the speed of the engine is increased to decrease the mechanical advantage between the engine and the hydraulic motor means and increase the speed of the hydraulic motor means.

29. A hydraulic drive for an industrial truck comprising an engine,
two hydraulic pump means driven by said engine,
hydraulic motor means connected with traction wheels of the truck and adapted to be driven by fluid supplied by said hydraulic pump means,
conduit means for returning fluid from said pump means and said hydraulic motor means,
means for creating fluid pressure in said conduit means proportional to the rate of flow of fluid through said conduit means, whereby said fluid pressure increases as the speed of the engine increases, and
valve means responsive to increases in fluid pressure in said conduit means for first connecting one of said pump means to said hydraulic motor means and then connecting the other said pump means to said hydraulic motor means as the fluid pressure in said conduit means increases whereby to decrease the mechanical advantage between the engine and the hydraulic motor means and increase the speed of the hydraulic motor means.

30. A hydraulic drive for an industrial truck comprising an engine,
two hydraulic pump means driven by said engine,
variable displacement hydraulic motor means connected with traction wheels of the truck and adapted to be driven by fluid supplied by said hydraulic pump means,
a hydraulic servo motor for varying the displacement of said hydraulic motor means,
conduit means for returning fluid from said pump means and said hydraulic motor means,
means for creating fluid pressure in said conduit means proportional to the rate of flow of fluid through said conduit means whereby said fluid pressure increases as the speed of the engine increases,
valve means responsive to increases in fluid pressure in said conduit means for first connecting one of said pump means to said hydraulic motor means and then connecting the other said pump means to said hydraulic motor means as the fluid pressure in said conduit means increases whereby to decrease the mechanical advantage between the engine and the hydraulic motor means and increase the speed of the hydraulic motor means, and
control means responsive to the connection of said second pump means to said hydraulic motor means for applying said fluid pressure in said conduit means to said servo motor to operate said servo motor means to decrease the displacement of said hydraulic motor means.

31. A hydraulic drive for an industrial truck comprising,
an engine,
two hydraulic pump means driven by said engine,
hydraulic motor means connected with traction wheels of the truck and adapted to be driven by fluid supplied by said hydraulic pump means,
valve means including a spool movable to connect first one and then both of said pump means to said hydraulic motor means,
a chamber at one end of said spool through which return fluid from said pump means and hydraulic motor means circulates,
yielding means urging said spool toward said chamber, and
means for creating fluid pressure in said chamber proportional to the rate of flow of fluid through said chamber, whereby the fluid pressure in said chamber increases as the speed of the engine increases and acts on said spool to move said spool against the force of said yielding means to first connect one pump and then both pumps to said hydraulic motor means to decrease the mechanical advantage between the engine and the hydraulic motor means and increase the speed of the hydraulic motor means.

32. A hydraulic drive for an industrial truck comprising,
an engine,
two hydraulic pump means driven by said engine,
a variable displacement hydraulic motor means connected with traction wheels of the truck and adapted to be driven by fluid supplied by said hydraulic pump means,
a servo motor for changing the displacement of said hydraulic motor means,
valve means including a spool movable to connect first one and then both of said pump means to said hydraulic motor means,
a chamber at one end of said spool through which return fluid from said pump means and hydraulic motor means circulates, yielding means urging said spool toward said chamber,
means for creating fluid pressure in said chamber proportional to the rate of flow of fluid through said chamber, whereby the fluid pressure in said chamber increases as the speed of the engine increases and acts on said spool to move said spool against the force of said yielding means to first connect one pump and then both pumps to said hydraulic motor means to decrease the mechanical advantage between the engine and the hydraulic motor means and increase the speed of the hydraulic motor means, and
means for applying said fluid pressure in said chamber to said servo motor means to actuate said servo motor means to decrease the displacement of said hydraulic motor means to further decrease the mechanical advantage between said engine and said hydraulic motor means.

33. A hydraulic drive for an industrial truck comprising,
an engine,
two hydraulic pump means driven by said engine,
two hydraulic motor means connected with traction wheels of the truck and adapted to be driven by fluid supplied by said hydraulic pump means,
valve means including a first spool movable to connect first one and then both of said pump means to said hydraulic motor means,
a second spool movable to change the connection of said two hydraulic motor means from parallel to series,
a chamber at one end of said spools through which return fluid from said pump means and hydraulic motor means circulates,
yielding means urging said spools toward said chamber, and
means for creating fluid pressure in said chamber proportional to the rate of flow of fluid through said chamber, whereby the fluid pressure in said chamber increases as the speed of the engine increases and acts on said spools to move said spools against the force of said yielding means to first connect one pump and then both pumps to said hydraulic motor means and finally to change the connection of the hydraulic motor means from parallel to series, whereby to decrease the mechanical advantage between the engine and the hydraulic motor means and increase the speed of the hydraulic motor means.

34. A hydraulic drive for an industrial truck comprising,
an engine,
two hydraulic pump means driven by said engine,
two hydraulic motor means connected with traction wheels of the truck and adapted to be driven by fluid supplied by said hydraulic pump means,
valve means including a first spool movable to connect first one and then both of said pump means to said hydraulic motor means,
a second spool movable to change the connection of said two hydraulic motor means from parallel to series,
a chamber at one end of said spools through which return fluid from said pump means and hydraulic motor means circulates,
yielding means urging said spools toward said chamber,
means for creating fluid pressure in said chamber proportional to the rate of flow of fluid through said chamber, whereby the fluid pressure in said chamber increases as the speed of the engine increases and acts on said spools to move said spools against the force of said yielding means to first connect one pump and then both pumps to said hydraulic motor means and finally to change the connection of the hydraulic motor means from parallel to series, whereby to decrease the mechanical advantage between the engine and the hydraulic motor means and increase the speed of the hydraulic motor means, and
means for equalizing the pressure drop across each of said hydraulic motor means when said hydraulic motor means are connected in series.

35. A hydraulic drive comprising,
an engine,
hydraulic pump means driven by said engine,
hydraulic motor means adapted to be driven by fluid under pressure supplied by said hydraulic pump means,
a hydraulic reservoir from which said pump means may draw fluid, and
control means responsive to increase in the speed of said engine to connect the output side of said hydraulic pump means with said hydraulic motor means at a predetermined speed of said engine whereby said hydraulic motor means is driven by fluid under pressure supplied by said pump means.

36. A hydraulic drive comprising,
an engine,
variable displacement hydraulic pump means driven by said engine,
hydraulic motor means adapted to be driven by fluid under pressure supplied by said hydraulic pump means,
a hydraulic reservoir from which said pump means may draw fluid, and
control means responsive to increase in the speed of said engine to first connect the output side of said hydraulic pump means with said hydraulic motor means whereby said hydraulic motor means is driven by fluid under pressure supplied by said pump means, and to thereafter decrease the displacement of said hydraulic motor means to increase the speed of said hydraulic motor means.

37. A hydraulic drive comprising,
an engine,
hydraulic pump means driven by said engine,
hydraulic motor means adapted to be driven by fluid under pressure supplied by said hydraulic pump means,
a hydraulic reservoir from which said pump means may draw fluid,
means for creating hydraulic pressure proportional to increases in the speed of the engine, and
control means responsive to increase in said hydraulic pressure to connect the output side of said pump means with said hydraulic motor means whereby said hydraulic motor means is driven by fluid supplied by said hydraulic pump means.

38. A hydraulic drive comprising,
an engine,
hydraulic pump means driven by said engine,
variable displacement hydraulic motor means adapted to be driven by fluid under pressure supplied by said hydraulic pump means,
a hydraulic reservoir from which said pump means may draw fluid,
means for creating hydraulic pressure proportional to increases in the speed of the engine, and
control means responsive to increase in said hydraulic pressure to first connect the output side of said pump means with said hydraulic motor means whereby said hydraulic motor means is driven by fluid supplied by said hydraulic pump means, and to thereafter decrease the displacement of said variable displacement motor means to increase the speed of said hydraulic motor means.

39. A hydraulic drive comprising,
an engine,
hydraulic pump means driven by said engine,
hydraulic motor means adapted to be driven by fluid under pressure supplied by said hydraulic pump means, a hydraulic reservoir from which said pump means may draw fluid, and control means responsive to increase in the speed of said engine, means whereby said control means effect the connection of the output side of said hydraulic pump means with said hydraulic reservoir at low speed operation of said engine whereby said hydraulic motor means is not driven during a low speed operation of said engine, and means whereby said control means effect the connection of the output side of said hydraulic pump means with said hydraulic motor means at higher speed operation of said engine to effect operation of said hydraulic motor means by fluid under pressure supplied by said pump means.

40. A hydraulic drive comprising, an engine, hydraulic pump means driven by said engine, hydraulic motor means adapted to be driven by fluid under pressure supplied by said hydraulic pump means, a hydraulic reservoir from which said pump means may draw fluid, means for creating a hydraulic pressure proportional to increases in the speed of the engine, control means responsive to increase in said hydraulic pressure, and means whereby said control means effect connection of the output side of said hydraulic pump means with said hydraulic reservoir when the hydraulic pressure created by said means is low, whereby said hydraulic motor means is not driven during low speed operation of said engine, and means whereby said control means effect connection of the output side of said pump means with said hydraulic motor means when high hydraulic pressure is created by said means whereby said hydraulic motor means is driven by fluid supplied by said hydraulic pump means.

41. A hydraulic drive comprising, an engine, hydraulic pump means driven by said engine, variable displacement hydraulic motor means adapted to be driven by fluid under pressure supplied by said hydraulic pump means, a hydraulic reservoir from which said pump means may draw fluid, control means responsive to increase in the speed of said engine, means whereby said control means effect the connection of the output side of said hydraulic pump means with said hydraulic reservoir at low speed operation of said engine whereby said hydraulic motor means is not driven during low speed operation of said engine, means whereby said control means effects connection of the output side of said hydraulic pump means with said variable displacement hydraulic motor means and decreases the displacement of said variable displacement hydraulic motor means at higher speed operation of said engine whereby said hydraulic motor means is driven by fluid under pressure supplied by said pump means and the displacement of the hydraulic motor means is decreased to increase the speed of the hydraulic motor means.

42. A hydraulic drive comprising:

an engine;

hydraulic pump means driven by said engine;

hydraulic motor means adapted to be driven by fluid under pressure supplied by said hydraulic pump means;

hydraulic reservoir means connected to said pump means;

passage means between said pump means and said motor means;

bypass means interconnecting said passage means and said reservoir means;

means for opening said bypass to divert substantially all of said fluid to said reservoir means;

control means responsive to increase in the speed of said engine to regulate said bypass means and control the volumetric output of said hydraulic pump means, whereby said hydraulic motor means is driven by fluid under pressure supplied by said pump means and to thereafter decrease the displacement of said hydraulic motor means to increase the speed of said hydraulic motor means.

43. A hydraulic drive comprising:

an engine;

hydraulic pump means driven by said engine;

hydraulic motor means adapted to be driven by fluid under pressure supplied by said hydraulic pump means;

hydraulic reservoir means connected to said pump means;

passage means between said pump means and said motor means;

bypass means interconnecting said passage means and said reservoir means;

control means responsive to the retardation of said hydraulic motor means to open said bypass means and operatively connect the output side of said hydraulic pump means with said reservoir means to prevent overloading and stalling of said engine.

44. A hydraulic drive comprising:

an engine;

hydraulic pump means driven by said engine;

hydraulic motor means adapted to be driven by fluid under pressure supplied by said hydraulic pump means;

hydraulic reservoir means connected to said pump means;

passage means between said pump means and said motor means;

bypass means interconnecting said passage means and said reservoir means;

control means responsive to the retardation of said hydraulic motor means to open said bypass means to vary the volumetric output of said hydraulic pump means, whereby the mechanical advantage between said engine and said hydraulic motor means is increased to prevent overloading and stalling of the engine.

References Cited by the Examiner
UNITED STATES PATENTS

| | | | |
|---|---|---|---|
| 2,326,821 | 8/43 | Boyle | 60—19 |
| 2,554,381 | 5/51 | Patterson | 60—52 |
| 3,054,263 | 9/62 | Budzich et al. | 60—53 |

JULIUS E. WEST, *Primary Examiner.*

EDGAR W. GEOGHEGAN, *Examiner.*